US012067875B2

(12) United States Patent
Ueno et al.

(10) Patent No.: US 12,067,875 B2
(45) Date of Patent: Aug. 20, 2024

(54) TRAVEL ASSISTANCE METHOD, ROAD CAPTURED IMAGE COLLECTION METHOD, AND ROADSIDE DEVICE

(71) Applicant: Panasonic Intellectual Property Management Co., Ltd., Osaka (JP)

(72) Inventors: Tsuyoshi Ueno, Kanagawa (JP); Shintaro Muramatsu, Kanagawa (JP); Yoichi Nakagawa, Tokyo (JP); Koichi Aihara, Kanagawa (JP); Makoto Yasugi, Tokyo (JP); Hiroaki Sudo, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 284 days.

(21) Appl. No.: 17/633,168

(22) PCT Filed: Jul. 21, 2020

(86) PCT No.: PCT/JP2020/028268
§ 371 (c)(1),
(2) Date: Feb. 4, 2022

(87) PCT Pub. No.: WO2021/024798
PCT Pub. Date: Feb. 11, 2021

(65) Prior Publication Data
US 2022/0301427 A1  Sep. 22, 2022

(30) Foreign Application Priority Data
Aug. 6, 2019  (JP) .................. 2019-144711

(51) Int. Cl.
*G08G 1/0967* (2006.01)
*G07C 5/00* (2006.01)
*G08G 1/0969* (2006.01)

(52) U.S. Cl.
CPC ....... *G08G 1/096741* (2013.01); *G07C 5/008* (2013.01); *G08G 1/096716* (2013.01); *G08G 1/096775* (2013.01); *G08G 1/0969* (2013.01)

(58) Field of Classification Search
CPC .... G05D 1/00; G07C 5/008; G08G 1/096716; G08G 1/096741; G08G 1/096775; G08G 1/0969
(Continued)

(56) References Cited

U.S. PATENT DOCUMENTS

2007/0040705 A1  2/2007  Yoshioka et al.
2017/0369051 A1*  12/2017  Sakai ................... G06V 10/255
(Continued)

FOREIGN PATENT DOCUMENTS

CN  114333314 A *  4/2022 ............. G01C 21/32
JP  2001-283381 A  10/2001
(Continued)

OTHER PUBLICATIONS

International Search Report, mailed Sep. 24, 2020, for International Application No. PCT/JP2020/028268 (5 pages including translation).

*Primary Examiner* — Atul Trivedi
(74) *Attorney, Agent, or Firm* — Seed IP Law Group LLP

(57) ABSTRACT

Provided is a system which can reduce load on a travel controller that performs a danger avoidance operation by preliminarily detecting a significant event without increasing an amount of ITS communications, thereby providing suitable assistance for travel control of autonomous vehicles. When a vehicle 1 passes through a certain section of a road after an in-vehicle terminal 4 has detected a significant event while the vehicle 1 is traveling in the section, the in-vehicle terminal 4 transmits event data (images and other information related to the event) to a roadside (Continued)

apparatus 6 at an end point of the section. The roadside apparatus 6 transmits the event data to another roadside apparatus 6 at a start point of the section, which in turn transmits the event data to an in-vehicle device in another vehicle entering the section so that the device can perform travel control based on the event data.

13 Claims, 18 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2017/0371608 | A1* | 12/2017 | Wasserman | G07C 5/008 |
| 2018/0130353 | A1* | 5/2018 | Pandurangarao | G07C 5/008 |
| 2018/0164825 | A1* | 6/2018 | Matus | B60W 60/00188 |
| 2018/0188742 | A1* | 7/2018 | Wheeler | G06F 16/29 |
| 2018/0259967 | A1* | 9/2018 | Frazzoli | B60W 30/0956 |
| 2018/0259969 | A1* | 9/2018 | Frazzoli | B60W 10/20 |
| 2018/0281794 | A1* | 10/2018 | Ravichandran | B60W 60/007 |
| 2018/0281795 | A1* | 10/2018 | Ravichandran | B60W 50/038 |
| 2018/0281796 | A1* | 10/2018 | Ravichandran | B60W 30/181 |
| 2018/0281817 | A1* | 10/2018 | Ravichandran | B60W 40/076 |
| 2018/0284771 | A1* | 10/2018 | Ravichandran | B60W 30/181 |
| 2018/0284772 | A1* | 10/2018 | Ravichandran | B60W 30/18 |
| 2018/0299284 | A1* | 10/2018 | Wang | G08G 1/0112 |
| 2018/0335781 | A1* | 11/2018 | Chase | G08G 1/0145 |
| 2018/0364701 | A1* | 12/2018 | Liu | G05D 1/0027 |
| 2018/0364702 | A1* | 12/2018 | Liu | G05D 1/0055 |
| 2018/0364703 | A1* | 12/2018 | Liu | G05D 1/0088 |
| 2018/0364704 | A1* | 12/2018 | Liu | G07C 5/008 |
| 2018/0365908 | A1* | 12/2018 | Liu | G05D 1/005 |
| 2018/0376305 | A1* | 12/2018 | Ramalho de Oliveira | H04W 4/44 |
| 2019/0011910 | A1* | 1/2019 | Lockwood | G08G 1/164 |
| 2019/0011912 | A1* | 1/2019 | Lockwood | G05D 1/0044 |
| 2019/0019349 | A1* | 1/2019 | Dolgov | B60W 60/0025 |
| 2019/0025819 | A1* | 1/2019 | Ferguson | G08G 1/0145 |
| 2019/0025820 | A1* | 1/2019 | Ferguson | G08G 1/143 |
| 2019/0039545 | A1* | 2/2019 | Kumar | G05D 1/228 |
| 2019/0232957 | A1* | 8/2019 | Frazzoli | B60W 60/0016 |
| 2019/0251838 | A1* | 8/2019 | Bernhardt | G08G 1/096741 |
| 2021/0063162 | A1* | 3/2021 | Moskowitz | G01C 21/28 |
| 2021/0073873 | A1* | 3/2021 | Kawashima | G06Q 30/0278 |
| 2021/0142590 | A1* | 5/2021 | Patel | G07C 5/008 |
| 2021/0223391 | A1* | 7/2021 | Drysch | G08G 1/0129 |
| 2021/0404829 | A1* | 12/2021 | St. Romain | G08G 1/0129 |
| 2022/0101662 | A1* | 3/2022 | Griffin | G07C 5/008 |

FOREIGN PATENT DOCUMENTS

| | | | | |
|---|---|---|---|---|
| JP | 2007-051973 A | | 3/2007 | |
| JP | 2017-021745 A | | 1/2017 | |
| JP | 2017-151148 A | | 8/2017 | |
| JP | 2017-182757 A | | 10/2017 | |
| JP | 2018-147055 A | | 9/2018 | |
| WO | WO-2020139392 A1 | * | 7/2020 | ......... G01C 21/3815 |
| WO | WO-2022162995 A1 | * | 8/2022 | ............ B60W 50/14 |

\* cited by examiner

Fig.3A captured image significant event information

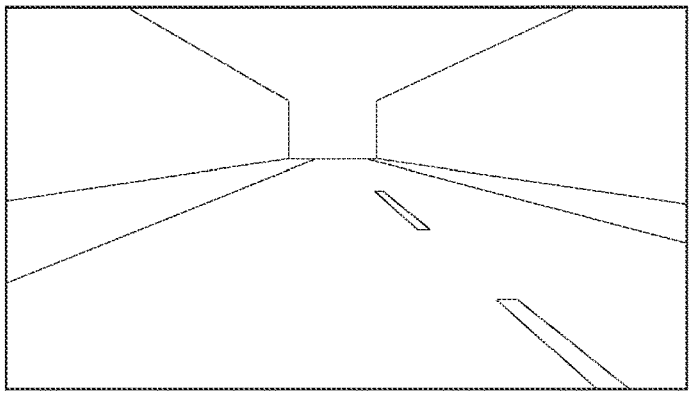

section info: P1
direction: upbound
significant event: -
position: latitude, longitude
time: 11:59
position in image: -

Fig.3B captured image
(at the time of detection of significant event)

significant event information

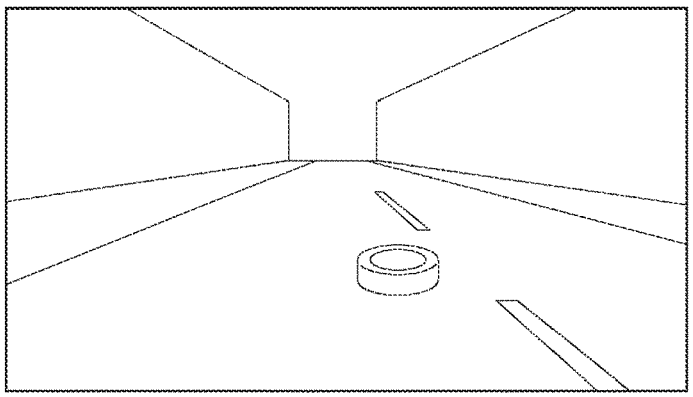

section info: P1
direction: upbound
significant event: obstacle (tire)
position: latitude, longitude
time: 12:00
position in image: (X1, Y1) - (X2, Y2)

Fig.3C captured image significant event information

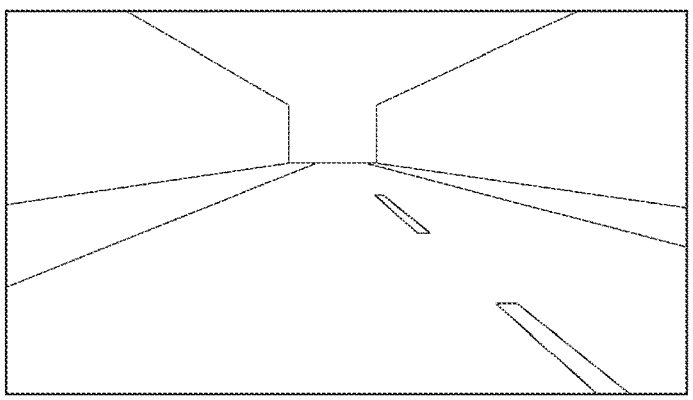

section info: P1
direction: upbound
significant event: -
position: latitude, longitude
time: 12:01
position in image: -

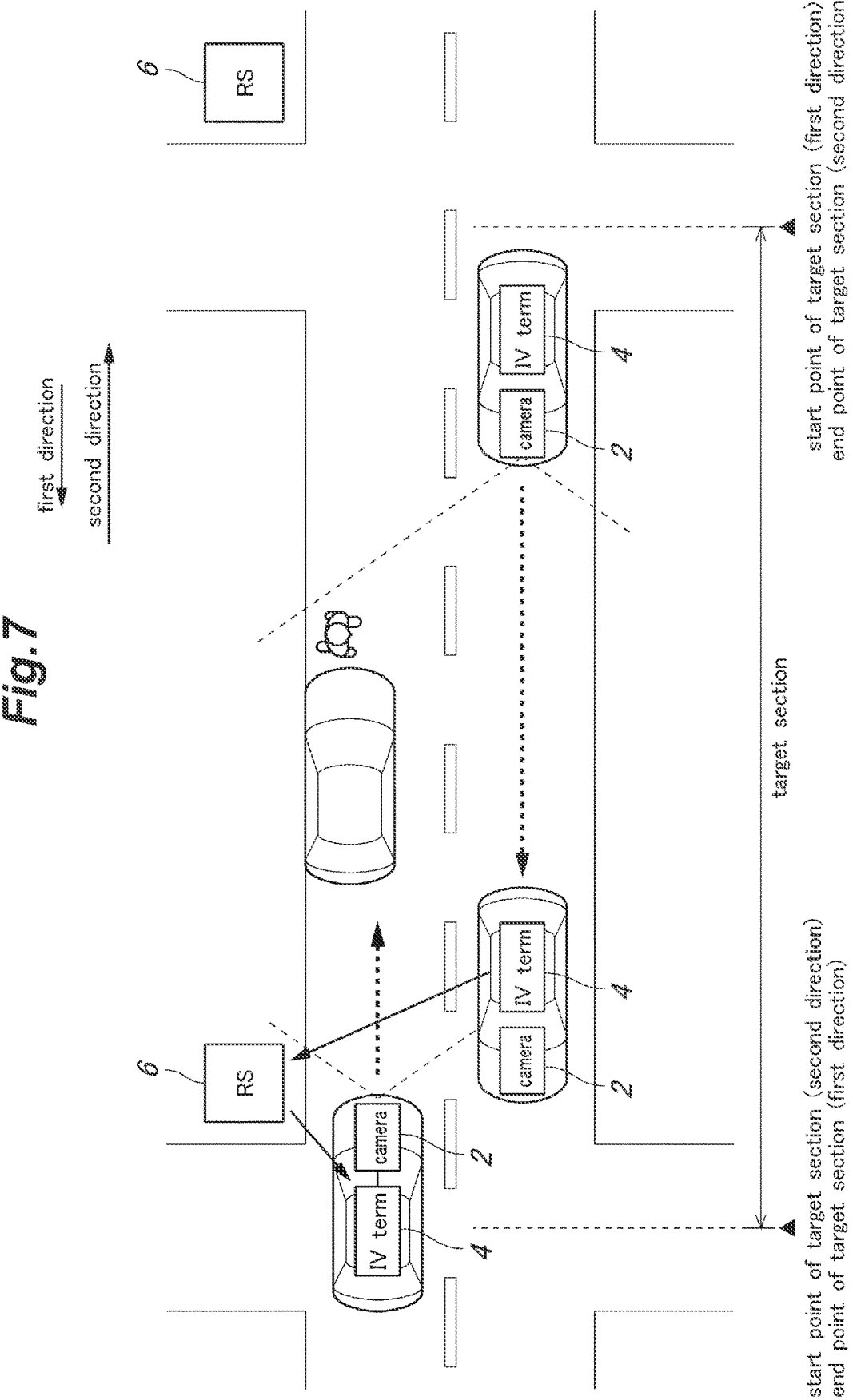

Fig.9
captured image (at the time of detection of significant event)
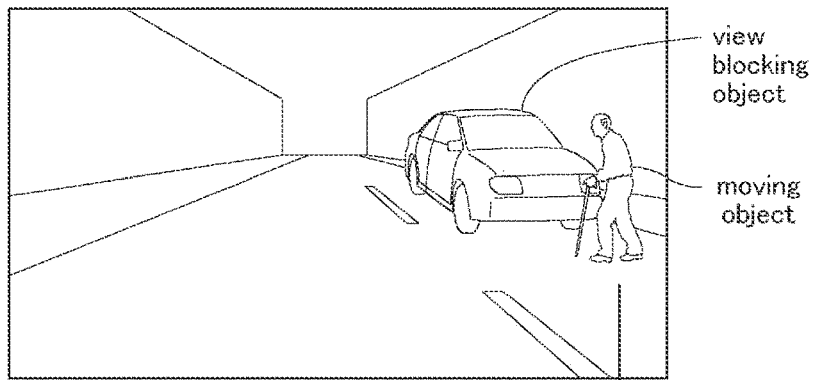
captured images of target section
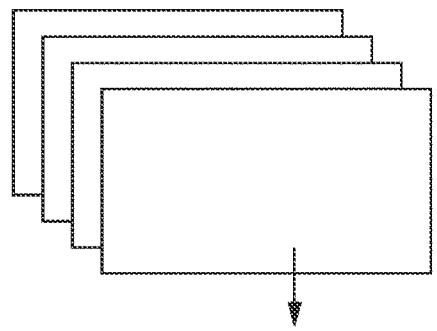
moving object image
flipped moving image
opposite direction captured image
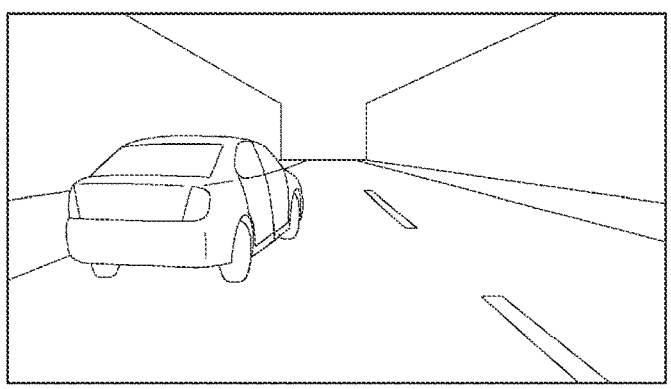
composite image
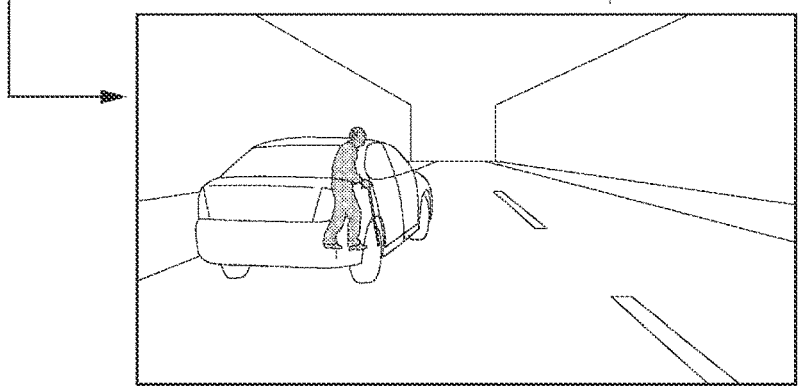

TRAVEL ASSISTANCE METHOD, ROAD CAPTURED IMAGE COLLECTION METHOD, AND ROADSIDE DEVICE

TECHNICAL FIELD

The present disclosure relates to a travel assistance method for assisting travel control of a vehicle, a road captured image collection method for collecting images of a road, and a roadside device for assisting travel control of a vehicle and collecting images of a road.

In recent years, safe driving assistance wireless systems utilizing ITS (Intelligent Transport System) have been practically used. Furthermore, studies have been in progress for the practical use of self-driving systems for assisting the driving of autonomous vehicles, in particular, by utilizing ITS communications in such systems. By utilizing ITS communications in such a self-driving system so that various types of information (such as information on road conditions) can be exchanged through communications between vehicles (vehicle-to-vehicle communications) and between a roadside apparatus on the road and vehicles (roadside-to-vehicle communications), the system can provide assistance for travel control of autonomous vehicles.

Examples of such technologies for providing assistance for travel control of autonomous vehicles by enabling communications for exchanging various types of information such as information on road conditions include: a system for collecting images of a location designated by a user, the images being captured by an in-vehicle camera (vehicle traveling data recorder, VTDR), and presenting the collected images to the user (Patent Document 1); and a system for detecting travel related information (i.e., traffic conditions and abnormal events (such as rockfall) around a vehicle) based on images captured by an in-vehicle camera, and transmitting the detected travel related information to another vehicle through vehicle-to-vehicle communications (Patent Document 2).

Patent Document 1: JP2017-182757A
Patent Document 2: JP2001-283381A

SUMMARY OF THE INVENTION

Task to be Accomplished by the Invention

A further technical idea is a system configured such that an in-vehicle device in a first vehicle acquires information on occurrence of a significant event on a road, such as presence of an obstacle or occurrence of a traffic accident on the road, and transmits the acquired information to a second vehicle which travels way behind the first vehicle. Such a system enables the second vehicle to travel with the prospect of the significant event that has occurred, thereby reducing the load on a controller in the second vehicle required to perform a danger avoidance operation in response to the detection of a significant event. In this case, information on occurrence of a significant event may include images captured by an in-vehicle camera as disclosed in Patent Document 1.

However, ITS communications (vehicle-to-vehicle communications) are used between a large number of terminals for transmitting a small amount of data for each communication. Thus, as taught in Patent Document 2, ITS communications can be suitably used to transmit travel related information consisting primarily of a small amount of character information. However, when a captured image with a relatively large amount of data need to be transmitted from a traveling vehicle as in the case of Patent Document 1, an undesirably large load on ITS communication links can be a problem.

The present disclosure has been made in view of the problem of the prior art, and a primary object of the present disclosure is to provide a travel assistance method, a road captured image collection method, and a roadside device which can reduce load on a travel controller that performs a danger avoidance operation by detecting in advance a significant event without increasing an amount of ITS communications, to thereby provide suitable assistance for travel control of autonomous vehicles.

Means to Accomplish the Task

An aspect of the present disclosure provides a travel assistance method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device, wherein the roadside device transmits the captured image and additional information related to the significant event directly or through a different roadside device to an information destination in-vehicle device mounted in a receiver vehicle which starts to travel in the target section, and wherein the information destination in-vehicle device performs operations related to travel control based on the captured image and additional information related to the significant event.

Another aspect of the present disclosure provides a road captured image collection method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device, and wherein the roadside device transmits the captured image and additional information related to the significant event to a server device, wherein the server device stores and maintains the captured image and additional information related to the significant event, and wherein, in response to a view request with specifying a location from a user, the server device presents the captured image and additional information related to the significant event at the specified location, to the user.

Yet another aspect of the present disclosure provides a roadside device comprising: a roadside-to-vehicle communication device configured to communicates with an in-vehicle device; a processor, wherein the processor is configured such that, under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device, when the roadside-to-vehicle communication device receives the captured image and additional information related to the significant transmitted from the information source in-vehicle device, the processor causes the roadside-to-vehicle communication device to transmit the captured image and additional information related to the significant event directly or through a different roadside device to an information destination in-vehicle device mounted in a receiver vehicle which starts to travel in the target section.

Still another aspect of the present disclosure provides a roadside device comprising: a roadside-to-vehicle communication device configured to communicates with an in-vehicle device; a processor, wherein the processor is configured such that, under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device, when the roadside-to-vehicle communication device receives the captured image and additional information related to the significant event transmitted from the information source in-vehicle device, the processor causes the roadside device to transmit the captured image and additional information related to the significant event to a server device.

Effect of the Invention

According to the present disclosure, in a case where a significant event has been detected while a vehicle travelling in a target section of a road, a captured image and additional information related to the significant event can be provided to other vehicles traveling in the target section afterward, which provides assistance for travel control of those vehicles. As a result, it becomes possible to detect in advance a dangerous event without increasing an amount of ITS communications to thereby reduce load on a travel controller that performs a danger avoidance operation, as well as providing suitable assistance for safe travel control of autonomous vehicles.

BRIEF DESCRIPTION OF THE DRAWINGS

FIGS. 3A to 3C are explanatory diagrams showing images captured by a camera 2 and information on a significant event generated by an in-vehicle terminal 4 according to the first embodiment;

FIG. 7 is an explanatory diagram showing an outline of a travel assistance system according to a second embodiment of the present disclosure;

FIG. 9 is an explanatory diagram showing an outline of an opposite lane image overlay operation performed by a roadside apparatus 6 according to the second embodiment;

DESCRIPTION OF THE PREFERRED EMBODIMENT(S)

Figure 1:
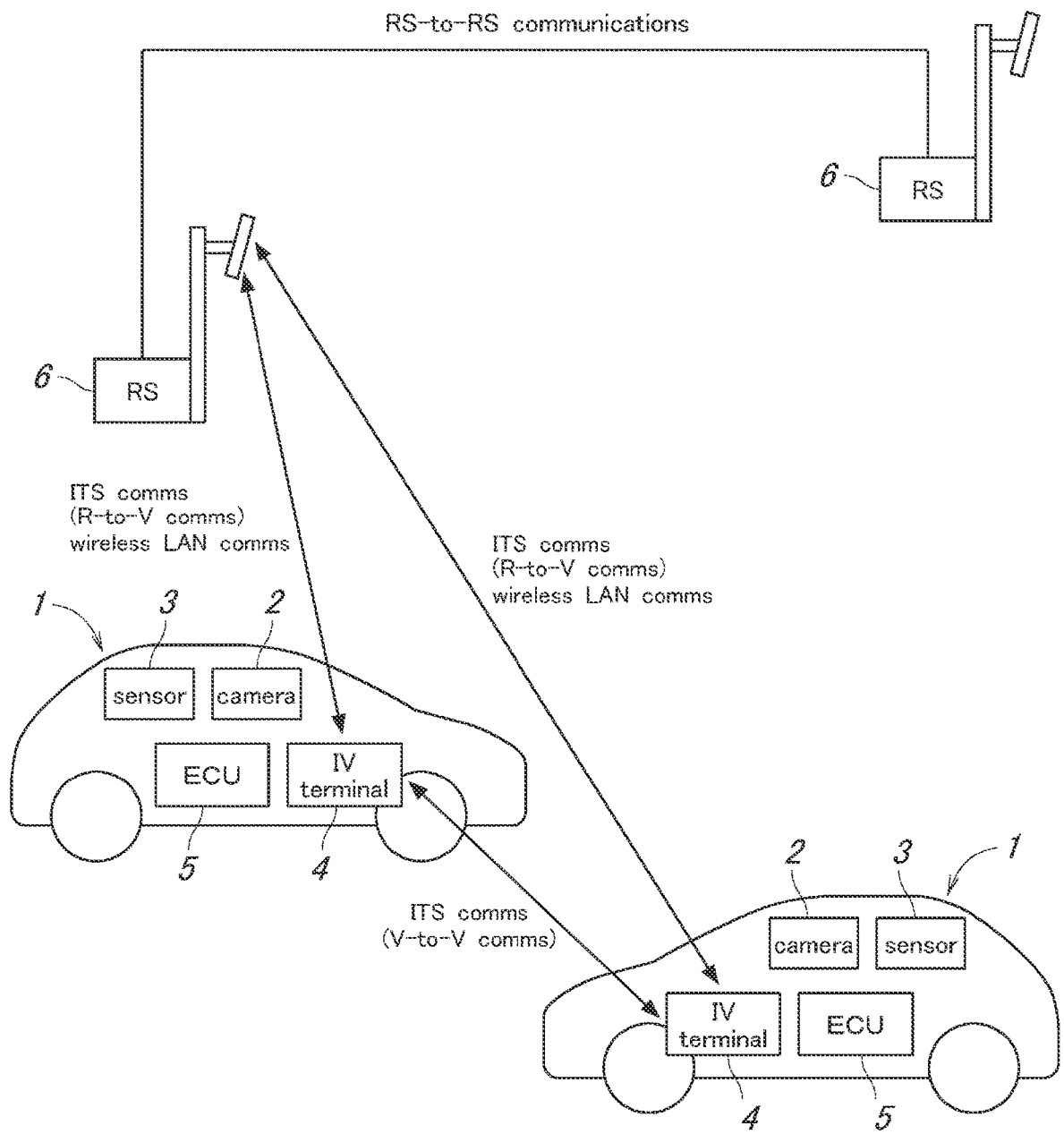
FIG. 1 is a diagram showing a general configuration of a travel assistance system according to a first embodiment of the present disclosure.

A first aspect of the present disclosure made to achieve the above-described object is a travel assistance method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device, wherein the roadside device transmits the captured image and additional information related to the significant event directly or through a different roadside device to an information destination in-vehicle device mounted in a receiver vehicle which starts to travel in the target section, and wherein the information destination in-vehicle device performs operations related to travel control based on the captured image and additional information related to the significant event.

In this configuration, in a case where a significant event has been detected while a vehicle travelling in a target section of a road, a captured image and additional information related to the significant event can be provided to other vehicles traveling in the target section afterward, which provides assistance for travel control of those vehicles. As a result, it becomes possible to detect in advance a significant event without increasing an amount of ITS communications to thereby reduce load on an in-vehicle controller device that performs a danger avoidance operation, as well as providing suitable assistance for travel control of autonomous vehicles.

A second aspect of the present disclosure is the travel assistance method of the first aspect, 1, wherein the additional information includes: section information on the section through which the vehicle has been traveling; direction information on the direction of travel of the vehicle; event information on the significant event; vehicle position information on the position of the vehicle in a map at the time of detection of the significant event; event location information on the location in the captured image at which the significant event has occurred; and time information on the time of detection of the significant event.

In this configuration, it become possible to properly grasp the situation of occurrence of a significant event.

A third aspect of the present disclosure is the travel assistance method of the first aspect, wherein the information destination in-vehicle device determines that the receiver vehicle is approaching the location of the occurrence of the significant event, based on a similarity between the captured image related to the significant event and a current captured image.

In this configuration, it become possible to accurately determine that the vehicle is approaching a significant point even when the position data acquired from a satellite positioning system becomes less accurate due to weak satellite radio wave signals. In this case, the accuracy of the determination can be improved when the determination is made based on the similarity between background images generated by removing moving object images from captured images.

A fourth aspect of the present disclosure is the travel assistance method of the third aspect, wherein, when determining that the receiver vehicle is approaching the location of the occurrence of the significant event, the information destination in-vehicle device outputs a danger avoidance operation instruction to a cruise controller.

This configuration can cause the travel controller to perform a danger avoidant operation in a more proper manner.

A fifth aspect of the present disclosure is the travel assistance method of the first aspect, wherein the information source in-vehicle device transmits the captured image and additional information related to the significant event to an end point roadside device located at an end point of the target section, wherein the end point roadside device transmits the captured image and additional information related to the significant event to a start point roadside device located at a start point of the target section, and wherein the start point roadside device transmits the captured image and additional information related to the significant event to the information destination in-vehicle device.

In this configuration, it becomes possible to surely acquire captured images and additional information related to significant events that have occurred in a target section between two roadside devices, from vehicles having traveled through the target section, and to surely provide the captured images and additional information related to the significant events to a vehicle entering the target section.

A sixth aspect of the present disclosure is the travel assistance method of the first aspect, wherein the information source in-vehicle device is mounted in the vehicle which travels in the target section in a first direction, wherein the information destination in-vehicle device is mounted in the receiver vehicle which travels in the target section in a second direction opposite to the first direction, and wherein the roadside device is configured to: extract an image of a moving object that appears in front of a view blocking object from the captured image acquired from the information source in-vehicle device in the vehicle traveling in the first direction; calculate the position of the moving object in a second captured image which was acquired in the past from the information source in-vehicle device mounted in a vehicle which traveled in the second direction; generate a composite image in which the image of the moving object is overlaid on the second captured image based on the calculated position of the moving object; and transmit the composite image as the captured image of the significant event to the information destination in-vehicle device.

This configuration can provide a composite image, in which a moving object (e.g., a pedestrian) behind a view blocking object (e.g., a parked vehicle) is made virtually visible, to an in-vehicle device, thereby enabling the in-vehicle device to perform a proper danger avoidance operation in consideration of the state of the moving object.

A seventh fifth aspect of the present disclosure is the travel assistance method of the first aspect, wherein the significant event is a traffic accident, wherein the roadside device is configured to: store and maintain therein a captured image and additional information related to the significant event acquired from the information source in-vehicle device; and transmit, in addition to the latest captured image and additional information related to the significant event, a captured image and additional information which have been maintained before capturing the latest captured image and additional information in the roadside device to the information destination in-vehicle device.

In this configuration, it becomes possible to perform a proper travel control so as to avoid a traffic accident at a point where traffic accidents have occurred frequently, based on the states of the traffic accidents in the past.

An eighth aspect of the present disclosure is a road captured image collection method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device, and wherein the roadside device transmits the captured image and additional information related to the significant event to a server device, wherein the server device stores and maintains the captured image and additional information related to the significant event, and wherein, in response to a view request with specifying a location from a user, the server device presents the captured image and additional information related to the significant event at the specified location, to the user.

This configuration can collect captured images at respective locations in the same manner as when fixed cameras are provided at the locations. This configuration can select images at a location designated by a user and present to the user, allowing the user to confirm the past states at the designated location.

A ninth aspect of the present disclosure is a roadside device comprising: a roadside-to-vehicle communication device configured to communicates with an in-vehicle device; a processor, wherein the processor is configured such that, under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device, when the roadside-to-vehicle communication device receives the captured image and additional information related to the significant transmitted from the information source in-vehicle device, the processor causes the roadside-to-vehicle communication device to transmit the captured image and additional information related to the significant event directly or through a different roadside device to an information destination in-vehicle device mounted in a receiver vehicle which starts to travel in the target section.

In this configuration, in a case where a significant event has been detected while a vehicle travelling in a target section of a road, a captured image and additional information related to the significant event can be provided to other vehicles traveling in the target section afterward, which provides assistance for travel control of those vehicles. As a result, it becomes possible to detect in advance a significant event to thereby reduce load on an in-vehicle controller device that performs a danger avoidance operation, as well as providing suitable assistance for travel control of autonomous vehicles.

A tenth aspect of the present disclosure is the roadside device of the ninth aspect, wherein the roadside-to-vehicle communication device is configured such that, when the roadside device is located at an end point of the target section, the roadside-to-vehicle communication device receives the captured image and additional information related to the significant event from the information source in-vehicle device, and when the roadside device is located at a start point of the target section, the roadside-to-vehicle communication device transmits the captured image and additional information related to the significant event to the information destination in-vehicle device.

In this configuration, it becomes possible to surely acquire captured images and additional information related to significant events that have occurred in a target section between two roadside devices, from vehicles having traveled through the target section, and to surely provide the captured images and additional information related to the significant events to a vehicle entering the target section.

An eleventh aspect of the present disclosure is the roadside device of the ninth aspect, wherein the roadside-to-vehicle communication device is configured to: receive the captured image and additional information related to the significant event from the information source in-vehicle device mounted in a vehicle which travels in the target section in a first direction, and transmit the captured image and additional information related to the significant event to the information destination in-vehicle device mounted in the receiver vehicle which travels in the target section in a second direction opposite to the first direction, and wherein the processor is configured to: extract an image of a moving object that appears in front of a view blocking object from the captured image acquired from the information source in-vehicle device in the vehicle traveling in the first direction; calculate the position of the moving object in a second captured image which was acquired in the past from the information source in-vehicle device mounted in a vehicle which traveled in the second direction; generate a composite image in which the image of the moving object is overlaid on the second captured image based on the calculated position of the moving object; and transmit the composite image as the captured image of the significant event to the information destination in-vehicle device.

This configuration can provide a composite image, in which a moving object (e.g., a pedestrian) behind a view blocking object (e.g., a parked vehicle) is made virtually visible, to an in-vehicle device, thereby enabling the in-vehicle device to perform a proper danger avoidance operation in consideration of the state of the moving object.

A twelfth aspect of the present disclosure is the roadside device of the ninth aspect, wherein the significant event is a traffic accident, wherein the processor is configured to: store and maintain in a storage a captured image and additional information related to the significant event acquired from the information source in-vehicle device; and transmit, in addition to the latest captured image and additional information related to the significant event, a captured image and additional information which have been maintained before capturing the latest captured image and additional information in the storage to the information destination in-vehicle device.

In this configuration, it becomes possible to perform a proper travel control so as to avoid a traffic accident at a point where traffic accidents have occurred frequently, based on the states of the traffic accidents in the past.

A thirteenth aspect of the present disclosure is a roadside device comprising: a roadside-to-vehicle communication device configured to communicates with an in-vehicle device; a processor, wherein the processor is configured such that, under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device, when the roadside-to-vehicle communication device receives the captured image and additional information related to the significant event transmitted from the information source in-vehicle device, the processor causes the roadside device to transmit the captured image and additional information related to the significant event to a server device.

This configuration can collect captured images at respective locations in the same manner as when fixed cameras are provided at the locations Embodiments of the present disclosure will be described below with reference to the drawings.

First Embodiment

FIG. 1 is a diagram showing a general configuration of a travel assistance system according to a first embodiment of the present disclosure.

The travel assistance system assists the driving of a vehicle 1 (autonomous vehicle) and includes: elements mounted in the vehicle 1, i.e., a camera 2, a sensor 3, an in-vehicle terminal 4 (in-vehicle device), and an autonomous driving ECU 5 (mobile controller, cruise controller); and a roadside apparatus 6 (roadside device).

The camera 2 captures images of a view looking frontward from the vehicle 1. The sensor 3 may be a radar, a lidar, an acceleration sensor, a gyro sensor, a steering angle sensor, a speed sensor, or any other suitable sensor. The autonomous driving ECU 5 detects an obstacle around the vehicle 1 based on outputs of the sensor 3, and also detects a state of the vehicle 1 to perform travel control of the vehicle 1.

The in-vehicle terminal 4 and the roadside apparatus 6 perform ITS communications with each other. ITS communications are performed using frequency bands adopted by ITS-based (i.e., using Intelligent Transport System) safe driving assistance wireless systems (for example, 700 MHz band or 5.8 GHz band). Messages including necessary information such as position data of vehicles are transmitted and received between such terminals and roadside apparatuses through ITS communications.

As used herein. "vehicle-to-vehicle communications" refer to ITS communications performed between in-vehicle terminals 4, "roadside-to-vehicle communications" refer to communications performed among roadside apparatuses 6 and in-vehicle terminals 4. In-vehicle terminal 4 and roadside apparatuses 6 can perform ITS communications with pedestrian terminals (not shown); that is, can perform pedestrian-to-vehicle communications and roadside-to-pedestrian communications.

An in-vehicle terminal 4 transmits and receives a message including position data to and from another in-vehicle terminal 4 through ITS communications (vehicle-to-vehicle communications), and determines a risk of collision between the vehicles. When determining that there is a risk of collision, the in-vehicle terminal 4 performs an alert operation for the driver. The alert operation is preferably performed using a car navigation device connected to the in-vehicle terminal 4. Furthermore, the in-vehicle terminal 4 transmits and receives messages to and from a pedestrian terminal through ITS communications (pedestrian-to-vehicle communications), and determines a risk of collision between the pedestrian and the vehicle.

The roadside apparatus 6 notifies in-vehicle terminals 4 and pedestrian terminals that there are a vehicle 1 and a pedestrian around the roadside apparatus 6 through ITS communications (roadside-to-vehicle communications, and roadside-to-pedestrian communications), which can prevent a collision when a vehicle turns left or right at an intersection outside the line of sight. In addition, the roadside apparatus 6 can deriver traffic information to pedestrian terminals 1 and in-vehicle terminals 4.

The roadside apparatus 6 and the in-vehicle terminal 4 perform communications with each other by using a wireless communication system such as a WiFi (registered trademark) system. Roadside apparatuses 6 perform communications (roadside-to-roadside communications) with each other via a dedicated roadside network (wired or wireless network) or any other network such as a cellular communication network.

Figure 2:
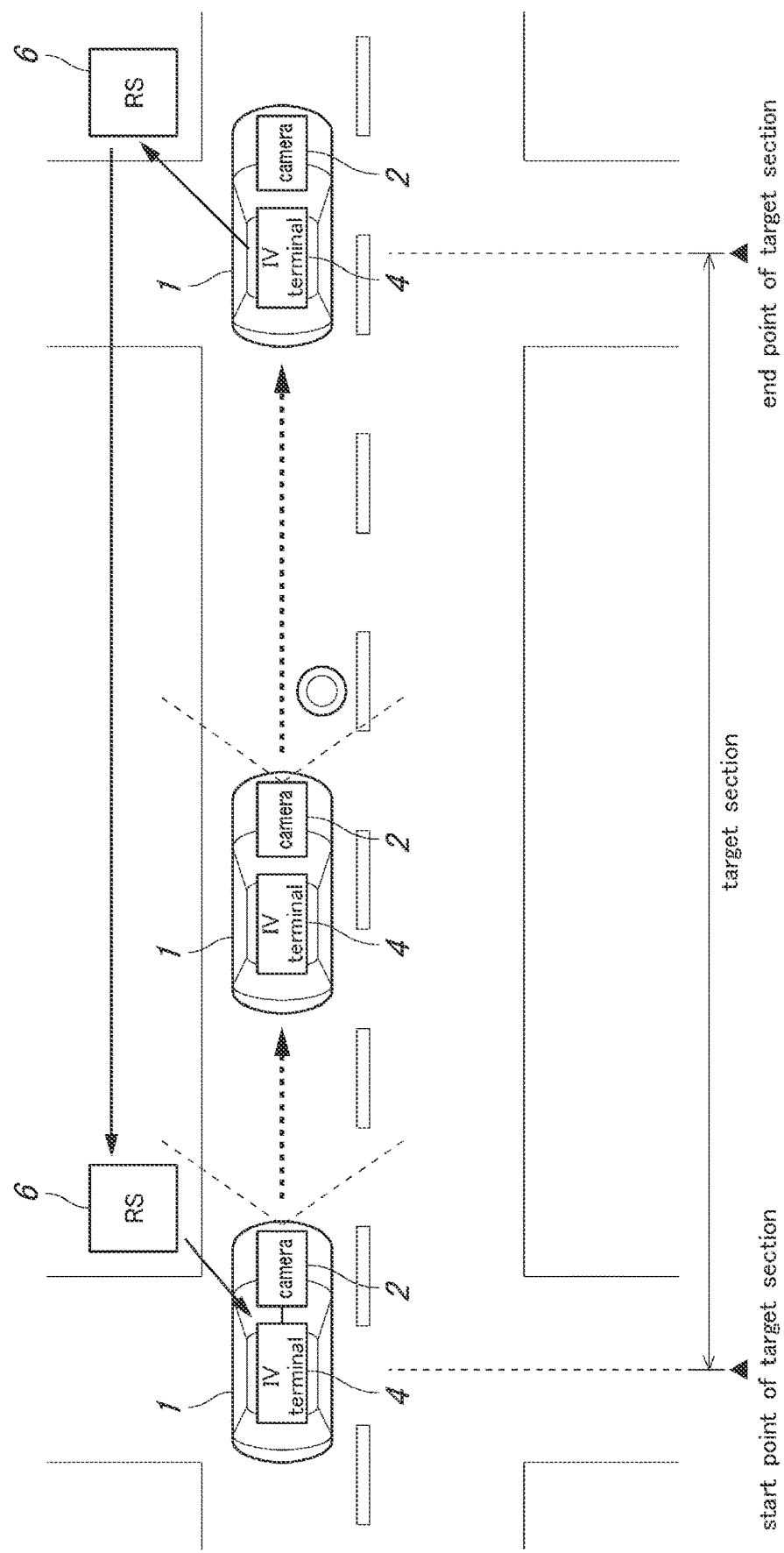
FIG. 2 is an explanatory diagram showing an outline of the travel assistance system according to the first embodiment.
Figure 4:
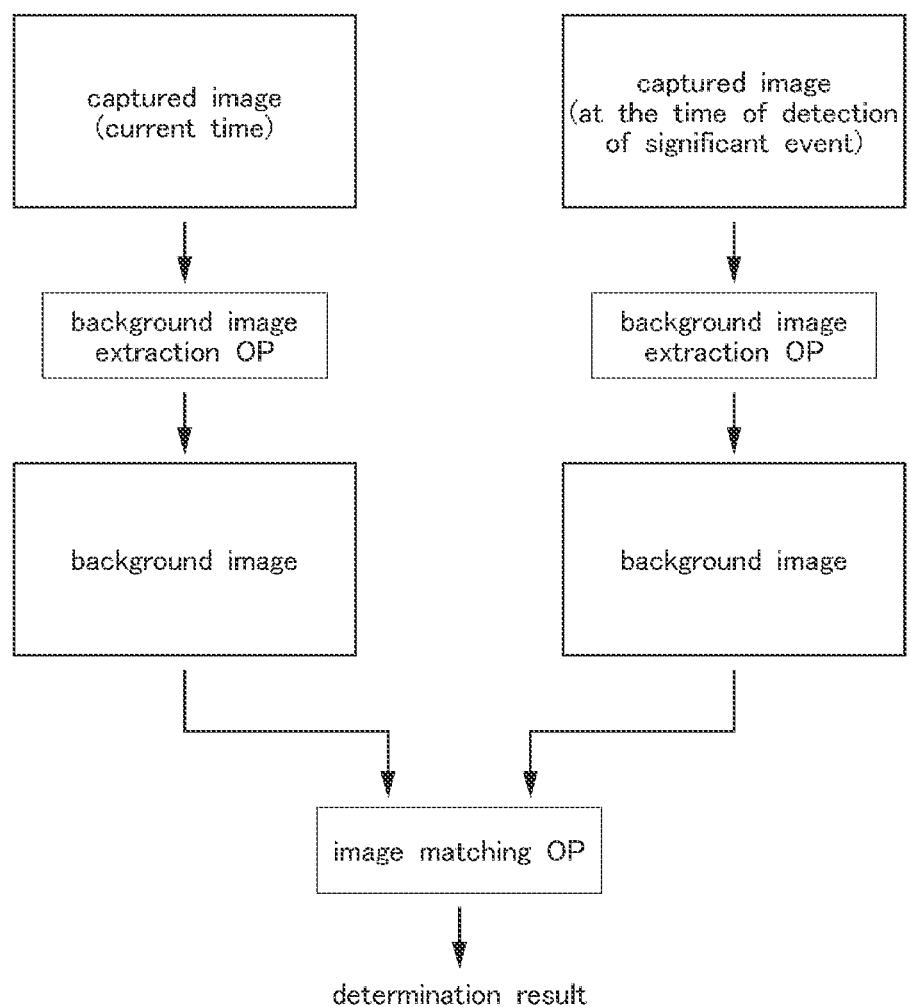
FIG. 4 is an explanatory diagram showing an outline of a significant point approaching determination operation performed in a vehicle 1 according to the first embodiment.

Next, an outline of the travel assistance system according to the first embodiment will be described. FIG. 2 is an explanatory diagram showing an outline of the travel assistance system according to the first embodiment. FIGS. 3A to 3C are explanatory diagrams showing images captured by a camera 2 and information on a significant event generated by an in-vehicle terminal 4 according to the first embodiment. FIG. 4 is an explanatory diagram showing an outline of a significant point approaching determination operation performed in a vehicle 1 according to the first embodiment.

As shown in FIG. 2, each roadside apparatus 6 is installed at an appropriate place on or near a road, for example, at an intersection. In the present embodiment, a target section of a road is a section between the two adjacent roadside apparatuses 6. In the example shown in FIG. 2, two roadside apparatuses 6 are installed near the road. When three or more roadside apparatuses 6 are installed near the road, a plurality of continuous target sections can be defined between respective pairs of adjacent roadside apparatuses 6. In this case, an end point roadside apparatus 6 located at the end point of one target section is also used as a start point roadside apparatus 6 located at the start point of the adjacent target section.

In a vehicle 1 traveling through a target section, the camera 2 captures images of a view looking frontward of the vehicle 1, and the in-vehicle terminal 4 detects a significant event occurring on the road ahead of the vehicle 1 based on the images captured by the camera 2 (significant event detection operation). The significant event is an object or a condition that may hinder the safe driving of the vehicle 1, such as an obstacle on the road (e.g., a fallen object that has fallen from a vehicle such as a tire or a seat), a skid mark on the road, or a sunken part of the road. The significant event may include a bicycles and a motorcycle traveling on the left side of the vehicle 1 because they may cause an accident when the vehicle turns left, for example. In addition, the significant event may include a vehicle which is turning right, a vehicle traveling at a speed greater than a predetermined level, or a vehicle traveling with the position in the lanes that is unstably changing, because they may cause an accident with the vehicle 1.

Next, the in-vehicle terminal 4 also determines the details of a significant event based on the captured images. For example, when the in-vehicle terminal 4 detects a significant object (such as a fallen object), the in-vehicle terminal 4 determines what type of object the significant object is. When detecting a significant event, the in-vehicle terminal 4 acquires position data of the significant point, i.e., the point where the significant event has occurred, such as the point where the accident has occurred or the point where an obstacle (such as am object which has fallen from a vehicle) is present in the form of coordinate values in a coordinate system in the captured image, for example.

When detecting a significant event, the in-vehicle terminal 4 generates significant event information. The significant event information is stored in a memory 14, which is part of a vehicle traveling data recorder (VTDR), as additional data of the captured image at the time of detection of the significant event. This significant event information includes: section information on the section within which the vehicle 1 is currently located; direction information on the direction of travel of the vehicle 1; event information on the significant event (such as type of an obstacle); vehicle position information on the position (latitude, longitude) of the vehicle 1 at the time of detection of the significant event; event location information on the location (the point) in the captured image at which the significant event has occurred; and time information on the time of detection of the significant event. The in-vehicle terminal 4 may acquire the section information from a start point roadside apparatus 6 located at the start point of the target section when the vehicle 1 enters the target section.

FIGS. 3A to 3C show an example in which a fallen object (tire) is present on the road as a significant event. At the time the image shown in FIG. 3A is captured, the captured image shows no obstacle on the road ahead of the vehicle 1. At the time the image shown in FIG. 3B is captured, the captured image shows a fallen object present on the road. At the time the image shown in FIG. 3C is captured, the captured image shows no obstacle on the road ahead the vehicle 1 after passing the significant point.

As shown in FIG. 2, when the vehicle 1 traveling in the target section approaches a nearby area of the end point of the target section, the in-vehicle terminal 4 transmits the captured image at the time of detection of the significant event and the significant event information, to an end point roadside apparatus 6 located at the end point of the target section.

The end point roadside apparatus 6 transmits the captured image at the time of detection of the significant event and the significant event information received from the in-vehicle terminal 4 to a start point roadside apparatus 6 located at the start point of the target section.

Then, the start point roadside apparatus 6 transmits the captured image at the time of detection of the significant event and the significant event information received from the end point roadside apparatus 6, to the in-vehicle terminal 4 of a vehicle 1 which is entering the target section.

In the vehicle 1, which has entered and is traveling in the target section, the in-vehicle terminal 4 instructs a danger avoidance operation based on the captured image at the time of detection of the significant event and the significant event information received from the start point roadside apparatus 6, and in response to an instruction from the in-vehicle terminal 4 for the danger avoidance operation, the autonomous driving ECU 5 performs travel control.

Then, as shown in FIG. 4, the in-vehicle terminal 4 determines whether or not the vehicle 1 has reached a nearby area of the significant point based on (i) a current captured image, which is captured by the camera 2 and stored in the memory 14 (part of the VTDR), and (ii) the captured image at the time of detection of the significant event (significant point approaching determination operation).

The significant point approaching determination operation involves extracting a background image from the current captured image. The in-vehicle terminal 4 also extracts a background image from the captured image at the time of detection of the significant event (background image extraction operation). Then, the in-vehicle terminal 4 compares the current background image extracted from the current captured image with the stored background image extracted from the captured image at the time of detection of the significant event, and determines whether or not the current background image matches the stored background image; that is, determines whether or not the degree of similarity between the two background images is greater than a predetermined value, to thereby determine whether or not the vehicle 1 has reached a nearby area of the significant point (image matching operation). As the vehicle 1 approaches the significant point, the similarity of the images gradually increases, and when the similarity becomes greater than the predetermined value, the in-vehicle terminal 4 determines that the vehicle 1 has reached the nearby area of the significant point.

As described above, in the present embodiment, the in-vehicle terminal 4 determines whether or not a current captured image is an image of the same point as a significant point based on the similarity between background images generated by removing images of moving objects (such as vehicle 1 and pedestrian) from captured images. Thus, the in-vehicle terminal 4 can accurately determine that the vehicle is approaching the significant point even when the position data acquired from a satellite positioning system becomes less accurate due to weak satellite radio wave signals.

When the vehicle 1 reaches the nearby area of the significant point, the in-vehicle terminal 4 provides an instruction for the danger avoidance operation to the autonomous driving ECU 5. The autonomous driving ECU 5 performs travel control based on the instruction for the danger avoidance operation from the in-vehicle terminal 4. As a result, prior to detecting an obstacle in real time based on a detection result of the sensor 3 mounted in the vehicle 1 and a result of an image recognition operation on an image captured by the camera 2, the autonomous driving ECU 5 can perform travel control with the prospect of the significant event that has occurred ahead of the vehicle 1; that is, the presence of an obstacle such as a fallen object from a vehicle or an accident vehicle. For example, the autonomous driving ECU 5 can perform travel control of the vehicle 1 so as to bypass the obstacle at an early stage, thereby ensuring to prevent the vehicle from a collision with the obstacle in a safe and smooth manner.

In the background image extraction operation, the in-vehicle terminal 4 detects an obstacle area or a moving object area in the captured image from the detection result of the obstacle detection based on outputs of the sensor 3 and the detection result of the motion detection in the captured image of the camera 2, and generates a background image which does not include the obstacle or moving object area in the image. The in-vehicle terminal 4 performs the image matching operation by using a known method such as template matching.

When performing the significant point approaching determination operation, the in-vehicle terminal 4 may refer to position information on the position (latitude, longitude) of the vehicle 1 at the time of detection of a significant event.

In the present embodiment, the in-vehicle terminal 4 performs an operation of extracting a background image from the captured image at the time of detection of the significant event (background image extraction operation). However, since the captured image at the time of detection of the significant event is provided from the roadside apparatus 6 to the in-vehicle terminal 4, the roadside apparatus 6 may perform the background image extraction operation on the captured image at the time of detection of the significant event before providing the image data to the in-vehicle terminal. This configuration can reduce processing load on the in-vehicle terminal 4.

Figure 5:
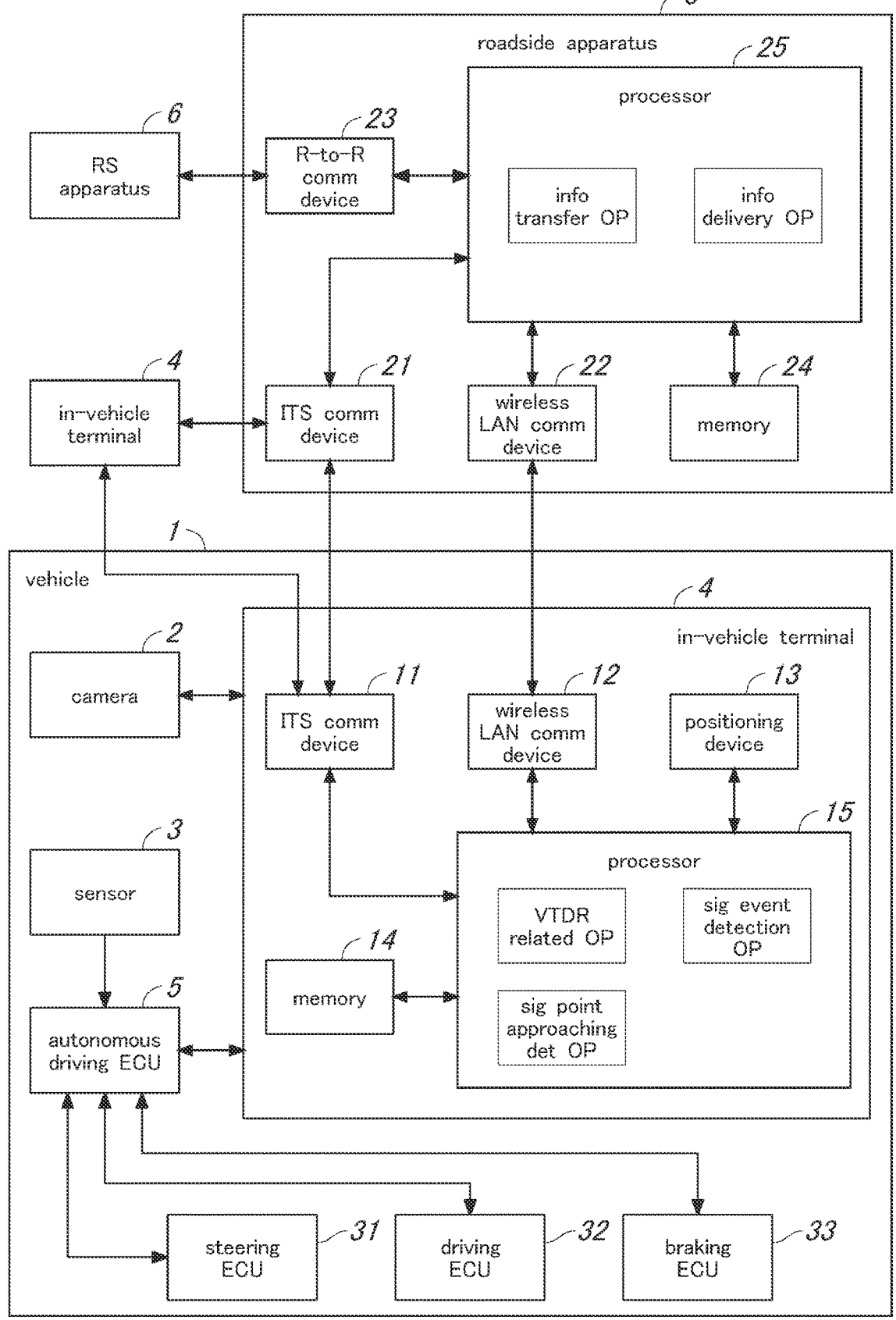
FIG. 5 is a block diagram showing schematic configurations of a vehicle 1 and a roadside apparatus 6 according to the first embodiment.

Next, schematic configurations of a vehicle 1 and a roadside apparatus 6 according to the first embodiment will be described. FIG. 5 is a block diagram showing schematic configurations of a vehicle 1 and a roadside apparatus 6.

The in-vehicle terminal 4 includes an ITS communication device 11 (vehicle-to-vehicle communication device, first roadside-to-vehicle communication device), a wireless LAN communication device 12 (second roadside-to-vehicle communication device), a positioning device 13, a memory 14, and a processor 15.

The ITS communication device 11 broadcasts messages to other in-vehicle terminals 4 through ITS communications (vehicle-to-vehicle communications), and also receives messages transmitted from other in-vehicle terminals 4. Furthermore, the ITS communication device 11 transmits and receives messages to and from roadside apparatuses 6 through ITS communications (roadside-to-vehicle communications). In particular, the ITS communication device 11 of the present embodiment transmits and receives information related to collision risk determination to and from other in-vehicle terminals and roadside apparatuses.

The wireless LAN communication device 12 transmits and receives messages to and from the roadside apparatuses 6 by using wireless LAN communication such as WiGig (registered trademark) or WiFi (registered trademark). In particular, the wireless LAN communication device 12 of the present embodiment transmits and receives captured images and additional information, to and from the roadside apparatuses.

The positioning device 13 determines the position of the in-vehicle terminal 4 by using a satellite positioning system such as GPS (Global Positioning System) or QZSS (Quasi-Zenith Satellite System), to thereby acquire the position data (latitude, longitude) of the in-vehicle terminal 4.

The memory 14 stores map information, programs executable by the processor 15, and other information.

The processor 15 performs various processing operations related to travel assistance by executing the programs stored in the memory 14. In the present embodiment, the processor 15 performs a VTDR related operation, the significant event detection operation, and the significant point approaching determination operation.

In the VTDR related operation, the processor 15 records images; that is, stores images captured by the camera 2 in the memory 14.

In the significant event detection operation, the processor 15 detects a significant event that has occurred on the road ahead of the vehicle 1 based on an image captured by the camera 2, and generates significant event information.

In the significant point approaching determination operation, the processor 15 determines whether or not the vehicle 1 has reached a nearby area of the significant point based on (i) a current captured image, which is captured by the camera 2 and stored in the memory 14 (part of the VTDR), and (ii) the captured image at the time of detection of the significant event. In the significant point approaching determination operation of the present embodiment, the processor 15 compares a current background image extracted from a current captured image with a stored background image extracted from the captured image at the time of detection of the significant event, and determines whether or not the current background image matches the stored background image; that is, determines whether or not the degree of similarity between the two background images is greater than a predetermined value, to thereby determine whether or not the vehicle 1 has reached a nearby area of the significant point.

The autonomous driving ECU 5 is connected to a steering ECU 31, a driving ECU 32, and a braking ECU 33. Based on the detection result of the sensor 3, the autonomous driving ECU 5 controls the steering ECU 31, the driving ECU 32, and the braking ECU 33 to implement automatic driving (autonomous driving) of the vehicle 1.

The steering ECU 31 controls the steering mechanism of the vehicle 1, while the driving ECU 32 controls the driving mechanism (such as engine, electric motor) of the vehicle 1. The braking ECU 33 controls the braking mechanism of the vehicle 1.

The types of automatic driving include autonomous driving which does not require a driver and driving assistance which assists a driver to drive the vehicle, and the system may be configured to operate in either of the switchable operation modes. i.e., the autonomous driving mode and the driving assistance mode. In the case of the driving assistance mode, when there is a risk of collision, the system needs to provide an alert to the driver. For example, a car navigation device may provide an alert to the driver by using voice or image display, based on the control of the in-vehicle terminal 4.

The roadside apparatus 6 includes an ITS communication device 21 (first roadside-to-vehicle communication device), a wireless LAN communication device 22 (second roadside-to-vehicle communication device), a roadside-to-roadside communication device 23 (third communication device), a memory 24, and a processor 25.

The ITS communication device 21 broadcasts messages to in-vehicle terminals 4 through ITS communications (roadside-to-vehicle communications), and also receives messages transmitted from the in-vehicle terminals 4. In particular, the ITS communication device 21 of the present embodiment transmits and receives information related to collision risk determination to and from in-vehicle terminals.

The wireless LAN communication device 22 transmits and receives messages to and from the in-vehicle terminals 4 by using wireless LAN communication such as WiFi (registered trademark). In particular, the wireless LAN communication device 22 of the present embodiment transmits and receives captured images and additional information, to and from the in-vehicle terminals.

The roadside-to-roadside communication device 23 communicates with the adjacent roadside apparatuses 6 via a dedicated roadside network (wired or wireless) or any other network such as cellular communication.

The memory 14 stores map information, programs executable by the processor 15, and other information.

The processor 25 performs various processing operations by executing the programs stored in the memory 24. In the present embodiment, the processor 25 performs an information transfer operation, and an information delivery operation.

In the information transfer operation, the processor 25 performs controls so as to select the start point roadside apparatus 6 located at the start point of a target section as the transfer destination, based on significant event information, in particular section information, contained in the message transmitted from an in-vehicle terminal 4, and then to cause the roadside-to-roadside communication device 23 to transmit a message including the captured image at the time of detection of the significant event and the significant event information, to the start point roadside apparatus 6.

In the information delivery operation, the processor 25 performs controls so as to acquire the captured image at the time of detection of the significant event and the significant event information included in the message transmitted from an end point roadside apparatus 6, and stores them in the memory 24; and to cause the roadside-to-roadside communication device 23 to transmit a message including the captured image at the time of detection of the significant event and the significant event information to in-vehicle terminals 4 that pass by the start point roadside apparatus 6.

Figure 6:
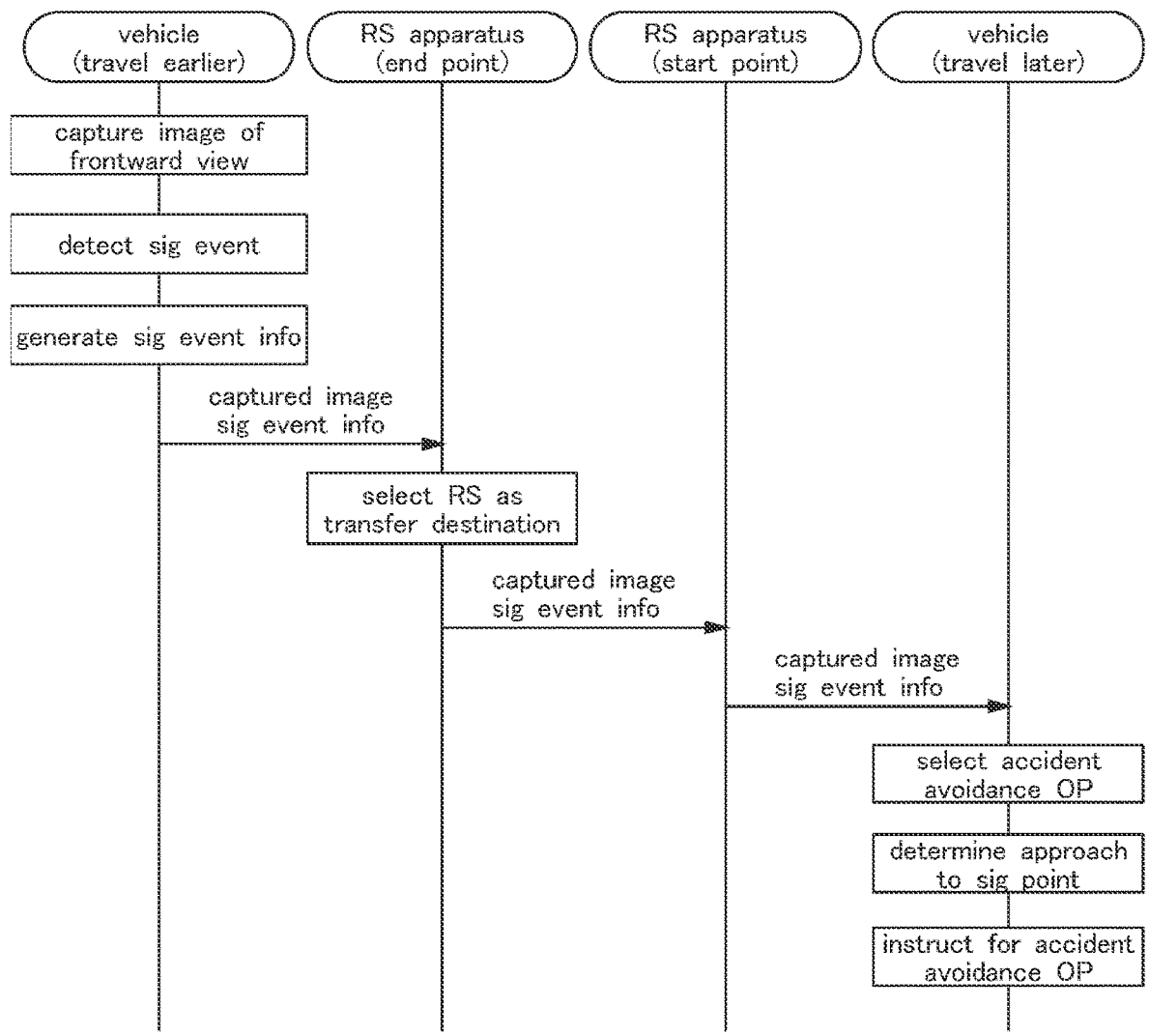
FIG. 6 is a sequence diagram showing procedures of operations performed by vehicles 1 and roadside apparatuses 6 according to the first embodiment.

Next, procedures of operations performed by vehicles 1 and roadside apparatuses 6 according to the first embodiment will be described. FIG. 6 is a sequence diagram showing procedures of operations performed by the vehicles 1 and the roadside apparatuses 6.

In the vehicle 1 that has passed through the target section first, the camera 2 captures images of a view looking frontward of the vehicle 1. Then, when the processor 15 of the in-vehicle terminal 4 detects an obstacle (a fallen object) on the road ahead as a significant event, the processor generates significant event information, and stores the generated significant event information in the memory 14 (part of the VTDR), as additional information related to the captured image.

Next, when detecting that the vehicle 1 has reached the end point of the target section based on a positioning operation result from the positioning device 13, the processor 15 of the in-vehicle terminal 4 acquires the captured image at the time of detection of the significant event and the significant event information from the memory 14. Then, the wireless LAN communication device 12 of the in-vehicle terminal 4 transmits a message including the captured image at the time of occurrence of the significant event and the significant event information to an end point roadside apparatus 6 located at the end point of the target section.

In the end point roadside apparatus 6, when the wireless LAN communication device 22 receives the message transmitted from the in-vehicle terminal 4, the processor 25 selects a start point roadside apparatus 6 located at the start point of the target section as a transfer destination based on the significant event information included in the message, particularly on the section information. Then, the roadside-to-roadside communication device 23 transmits a message including the captured image at the time of detection of the significant event and the significant event information, to the start point roadside apparatus 6.

In the start point roadside apparatus 6, when the roadside-to-roadside communication device 23 receives the message transmitted from the end point roadside apparatus 6, the processor 25 acquires the captured image at the time of detection of the significant event and the significant event information included in the message and stores them in the memory 24. Then, the wireless LAN communication device 22 transmits a message including the captured image at the time of detection of the significant event and the significant event information, to in-vehicle terminals 4 of vehicles that pass by the start point roadside apparatus 6.

In the vehicle 1 that travels through the target section afterward, when the wireless LAN communication device 12 of the in-vehicle terminal 4 receives the message transmitted from the start point roadside apparatus 6, the processor 15 of the in-vehicle terminal 4 acquires the captured image at the time of detection of the significant event and the significant event information included in the message, and stores them in the memory 14. Then, the processor 15 of the in-vehicle terminal 4 selects a danger avoidance operation (such as deceleration or detour) for avoiding an accident based on the captured image at the time of detection of the significant event (danger avoidance operation selection operation).

Next, the processor 15 of the in-vehicle terminal 4 determines whether or not the vehicle 1 has reached a nearby area of the significant point based on a current captured image, which is output from the camera 2 and stored in the memory 14 (part of the VTDR), and the captured image at the time of the accident at the significant point (significant point approaching determination operation).

Then, when the vehicle 1 reaches the nearby area of the significant point, the processor 15 provides an instruction for the danger avoidance operation to the autonomous driving ECU 5. The autonomous driving ECU 5 performs travel control so as to avoid the obstacle based on the instruction from the in-vehicle terminal 4.

Second Embodiment

Figure 8A:
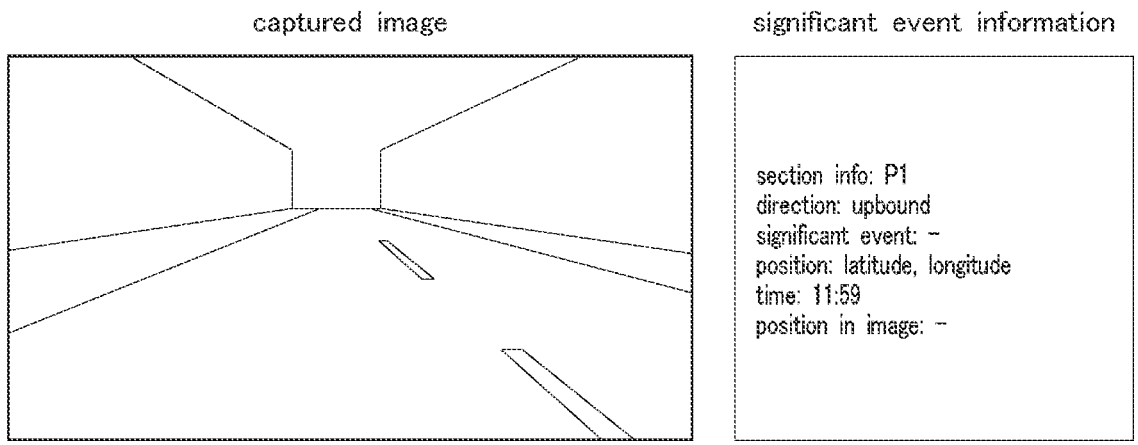
FIGS. 8A to 8C are explanatory diagrams showing images captured by a camera 2 and information on a significant event generated by an in-vehicle terminal 4 according to the second embodiment.
Figure 8B:
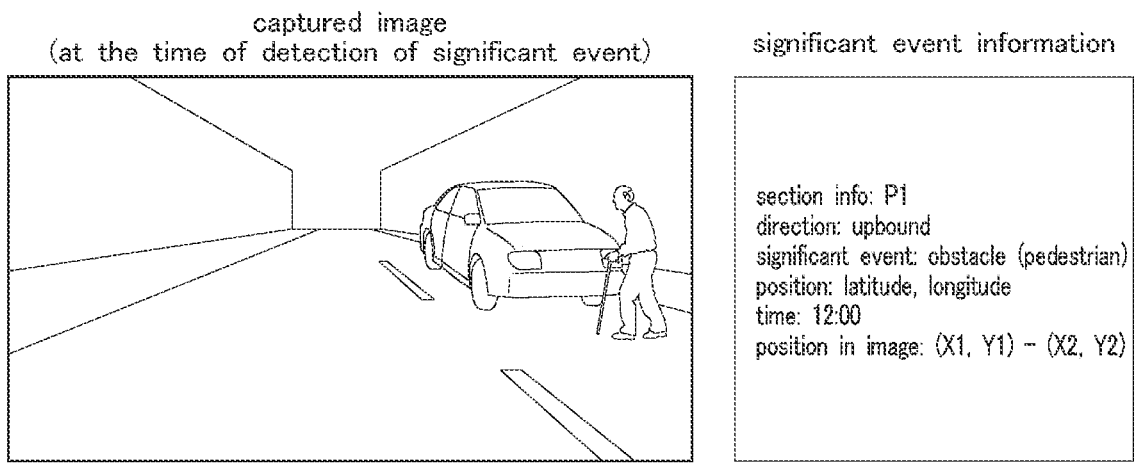
Figure 8C:
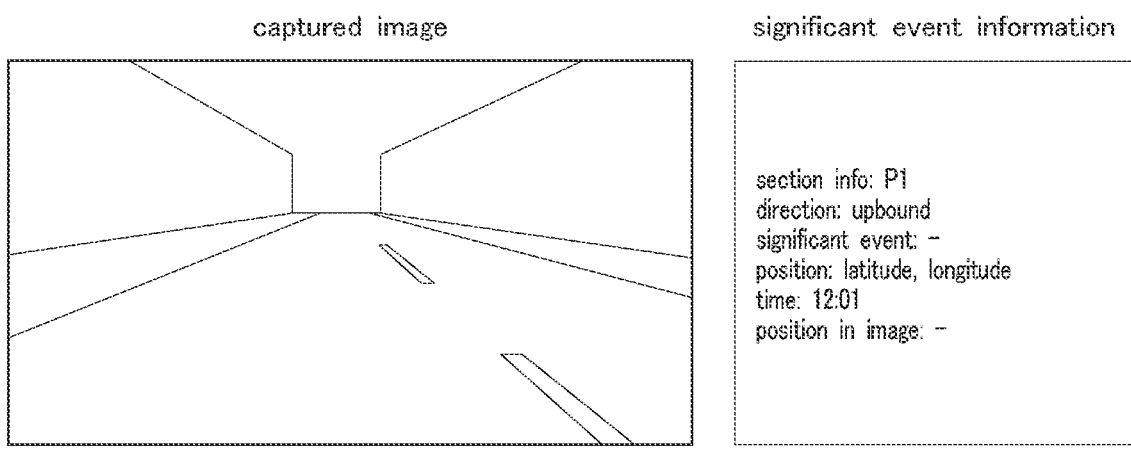

Next, a second embodiment of the present disclosure will be described. Except for what will be discussed here, the second embodiment is the same as the above-described first embodiment. FIG. 7 is an explanatory diagram showing an outline of a travel assistance system according to the second embodiment of the present disclosure. FIGS. 8A to 8C are explanatory diagrams showing images captured by a camera 2 and information on a significant event generated by an in-vehicle terminal 4. FIG. 9 is an explanatory diagram showing an outline of an opposite lane image overlay operation performed by a roadside apparatus 6.

As shown in FIG. 7, in a case where a pedestrian runs into the road from behind a parked vehicle on the road, the vehicle 1 cannot avoid the pedestrian, resulting in that an accident occurs in which the vehicle 1 collides with the pedestrian. However, the pedestrian, who is behind the parked vehicle on the road and thus cannot be seen from the vehicle 1, can be seen from an oncoming vehicle traveling in the opposite lane, and the camera 2 of the oncoming vehicle can capture images in which the pedestrian is shown in front of the parked vehicle.

The example shown in FIGS. 8A to 8C is a case where a pedestrian is in front of a parked vehicle on the opposite lane. In this case, the pedestrian is hidden behind the parked vehicle and cannot be seen from oncoming vehicles traveling in the opposite lane. Thus, when the pedestrian suddenly runs into the road from behind the parked vehicle, there is a risk of collision between the pedestrian and a vehicle traveling in the opposite lane.

In the present embodiment, an end point roadside apparatus 6 located at one end of the target section acquires non-line-of-sight information from an oncoming vehicle that has travelled through the target section in the opposite lane in the first direction (see FIG. 7), where the non-line-of-sight information indicates that there is an invisible moving object (such as pedestrian) hidden behind a view blocking object (parked vehicle), and the end point roadside apparatus 6 provides the non-line-of-sight information to an IV-terminal of a vehicle that has entered and is traveling in the target section in a second direction opposite to the first direction (see FIG. 7). In the vehicle that receives the non-line-of-sight information, the autonomous driving ECU 5 performs travel control so as to avoid the pedestrian running into the road.

As shown in FIG. 9, the roadside apparatus 6 uses the captured image at the time of detection of a significant event and the significant event information acquired from a vehicle traveling through the target section in the opposite lane, to generate a composite image in which a moving object image is overlaid on the captured image of a significant point (a point where an obstacle is present) captured from the opposite lane (opposite lane image overlay operation).

Specifically, from the captured image at the time of detection of the significant event included in the message, the roadside apparatus 6 first detects a moving object (such as a pedestrian) and a view blocking object having such a positional relationship as to hide the moving object when viewed from the opposite lane. Examples of the moving objects include pedestrians, bicycles, and animals. Examples of view blocking objects include a parked vehicle.

Based on the significant event information contained in the message, in particular the vehicle position information on the position at the time of detection of the significant event, the roadside apparatus 6 selects, from the captured images of the target section stored in the roadside apparatus, a captured image of a significant point captured from the opposite lane as an opposite-direction captured image. In this operation, the roadside apparatus 6 selects a captured image showing a view blocking object and having the latest capturing time; that is, one captured by the latest vehicle that has passed by the road side apparatus.

Based on the significant event information included in the message, in particular the position information on the position of the obstacle in the captured image at the time of detection of the significant event, the roadside apparatus 6 cuts out an obstacle, particularly a moving object area, from the captured image at the time of detection of the significant event to thereby generate a moving object image. Next, the roadside apparatus 6 flips the moving object image horizontally to generate a flipped moving object image so that the orientation of the moving object corresponds to the actual orientation. Although, in the present embodiment, the roadside apparatus 6 performs the operation to flip the moving object image horizontally, an image processing operation performed on the moving object image is not limited to the flipping operation. Alternatively, no image processing operation may be performed on the moving object image. In other embodiments, the roadside apparatus 6 may perform, in addition to the flipping operation, an additional image processing operation (such as a rotating operation) on the moving object image.

Next, based on the position information on the position of the obstacle in the captured image at the time of detection of the significant event, the roadside apparatus 6 generates a composite image in which a flipped moving object image is overlaid on an opposite-direction captured image (image captured from the opposite direction). In this operation, the roadside apparatus 6 calculates the position of the moving object in the opposite-direction captured image, and overlays the flipped moving object image on the opposite-direction captured image based on the calculated position. As a result, the flipped moving object image is overlaid on the view blocking object in the opposite-direction captured image. When overlaying the flipped moving object image on the opposite-direction captured image, the roadside apparatus 6 may enlarge or reduce the flipped moving object image so that the flipped moving object image matches the size of the view blocking object.

Based on a current captured image provided from the camera 2 and stored in the memory 14 (part of the VTDR), and the captured image of the significant point (the point where the significant event occurred) at the time of detection of the significant event, the in-vehicle terminal 4 determines whether or not the vehicle has reached a nearby area of the significant point (significant point approaching determination operation). In this operation, the in-vehicle terminal 4 uses a composite image generated by the roadside apparatus 6 as the captured image at the time of detection of the significant event to perform the significant point approaching determination operation.

Figure 10:
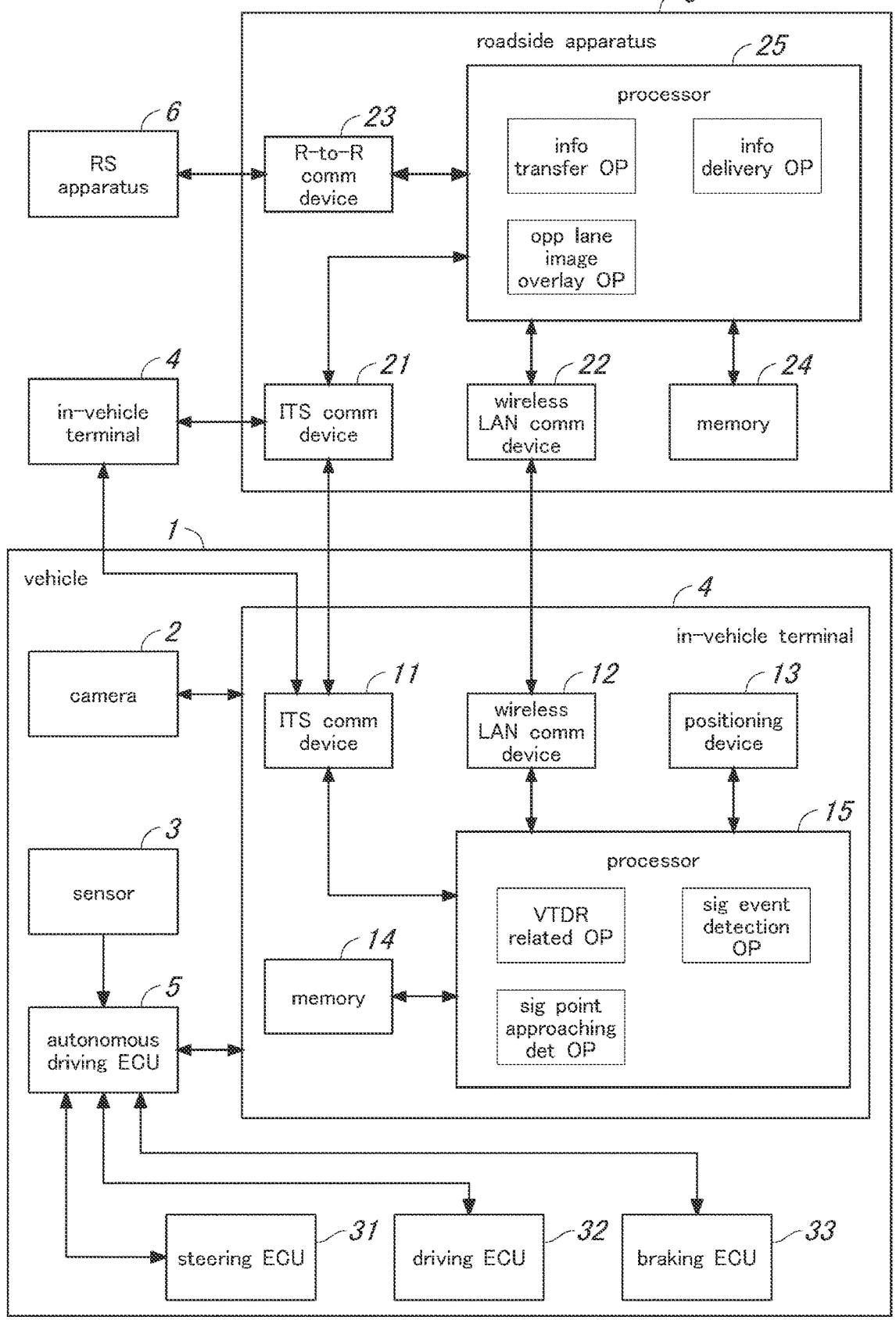
FIG. 10 is a block diagram showing schematic configurations of a vehicle 1 and the roadside apparatus 6 according to the second embodiment.

Next, schematic configurations of a vehicle 1 and the roadside apparatus 6 according to the second embodiment will be described. FIG. 10 is a block diagram showing schematic configurations of a vehicle 1 and the roadside apparatus 6.

The configuration of the vehicle 1 is the same as that of the first embodiment (FIG. 5).

The roadside apparatus 6 is substantially the same as that of the first embodiment except that the processor 25 performs an opposite lane image overlay operation in addition to the information transfer operation and the information delivery operation. In this operation, the processor 25 generates a composite image in which a moving object image is overlaid on a captured image of a significant point (a point where an obstacle is present) captured from the opposite lane, based on the captured image at the time of detection of the significant event and the significant event information included in the message.

Figure 11:
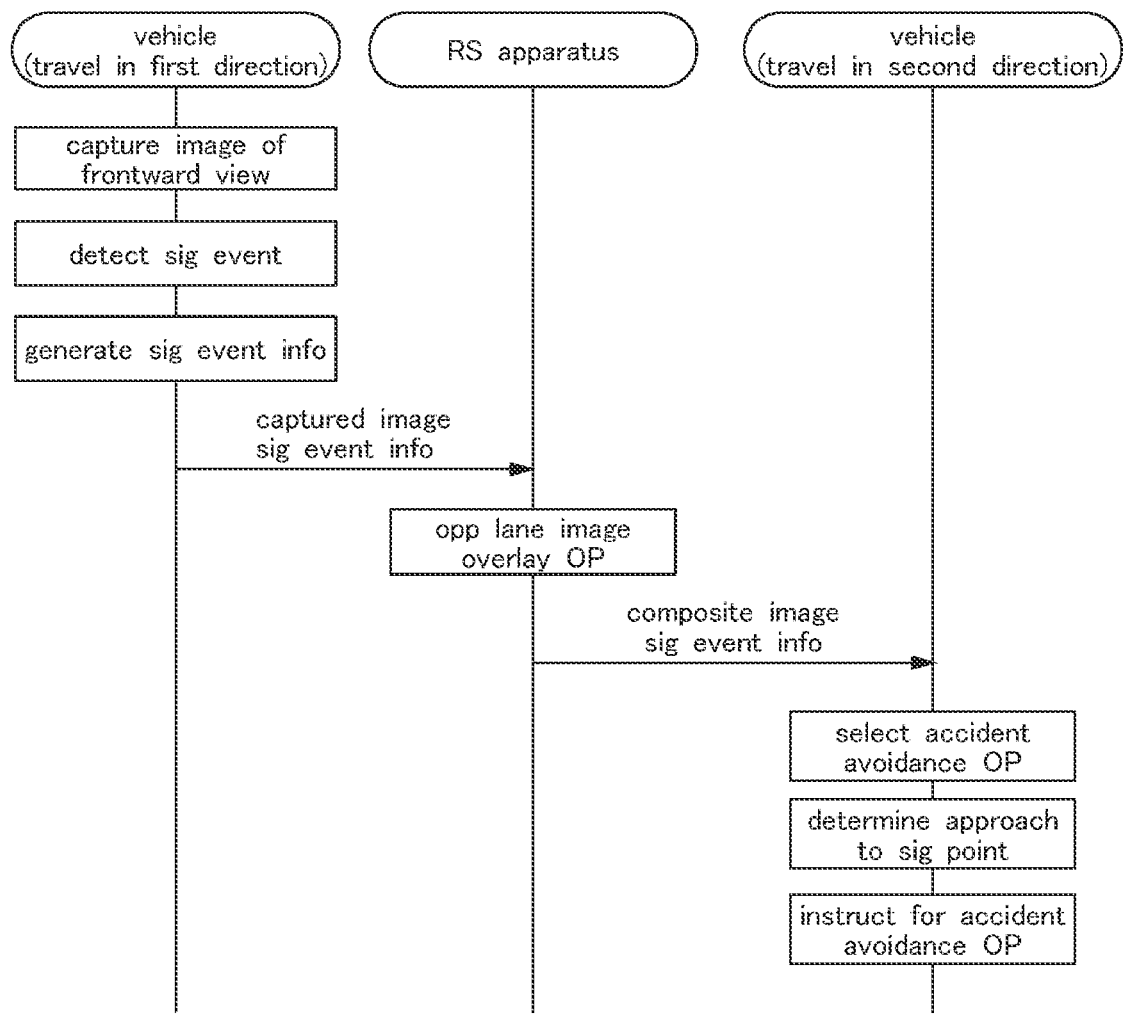
FIG. 11 is a sequence diagram showing procedures of operations performed by the vehicle 1 and the roadside apparatus 6 according to the second embodiment.

Next, procedures of operations performed by the vehicle 1 and the roadside apparatus 6 according to the second embodiment. FIG. 11 is a sequence diagram showing procedures of operations performed by the vehicle 1 and the roadside apparatus 6.

In the vehicle 1 that is traveling in the target section in a first direction, the camera 2 captures images of a view looking frontward of the vehicle 1. Then, when the processor 15 of the in-vehicle terminal 4 detects an obstacle on the road ahead as a significant event, the processor generates significant event information, and stored the generated significant event information in the memory 14 (part of the VTDR), as additional information related to the captured image.

Next, when detecting that the vehicle 1 has reached the end point of the target section based on a positioning operation result from the positioning device 13, the processor 15 of the in-vehicle terminal 4 acquires the captured image at the time of detection of the significant event and the significant event information from the memory 14. Then, the wireless LAN communication device 12 of the in-vehicle terminal 4 transmits a message including the captured image at the time of occurrence of the significant event and the significant event information to an end point roadside apparatus 6 located at the end point of the target section.

In the end point roadside apparatus 6, when the wireless LAN communication device 22 receives the message transmitted from the in-vehicle terminal 4, the processor 25 generates a composite image in which a moving object image is overlaid on a captured image of a significant point (a point where an obstacle is present) captured from the opposite lane, based on the captured image at the time of detection of the significant event and the significant event information included in the message (opposite lane image overlay operation).

Then, the wireless LAN communication device 22 transmits a message including the composite image and the significant event information to nearby in-vehicle terminals 4.

In the vehicle 1 that is traveling in the target section in a second direction opposite to the first direction, when the wireless LAN communication device 12 of the in-vehicle terminal 4 receives the message transmitted from the roadside apparatus 6, the processor 15 of the in-vehicle terminal 4 acquires the captured image of the significant point at the time of occurrence of an accident and the significant event information included in the message and stores them in the memory 14. Then, the processor 15 of the in-vehicle terminal 4 selects a danger avoidance operation (such as deceleration, or detour) for avoiding the accident based on the captured image of the significant point at the time of occurrence of the accident.

Next, based on the current captured image provided from the camera 2 and stored in the memory 14 (part of the VTDR), the processor 15 of the in-vehicle terminal 4 determines whether or not the vehicle 1 has reached a nearby area of the significant point (significant point approaching determination operation).

When the vehicle reaches the nearby area of the significant point, the processor 15 provides an instruction for the danger avoidance operation to the autonomous driving ECU 5. The autonomous operation ECU 5 performs travel control based on the instruction for the danger avoidance operation provided from the in-vehicle terminal 4.

Third Embodiment

Figure 12:
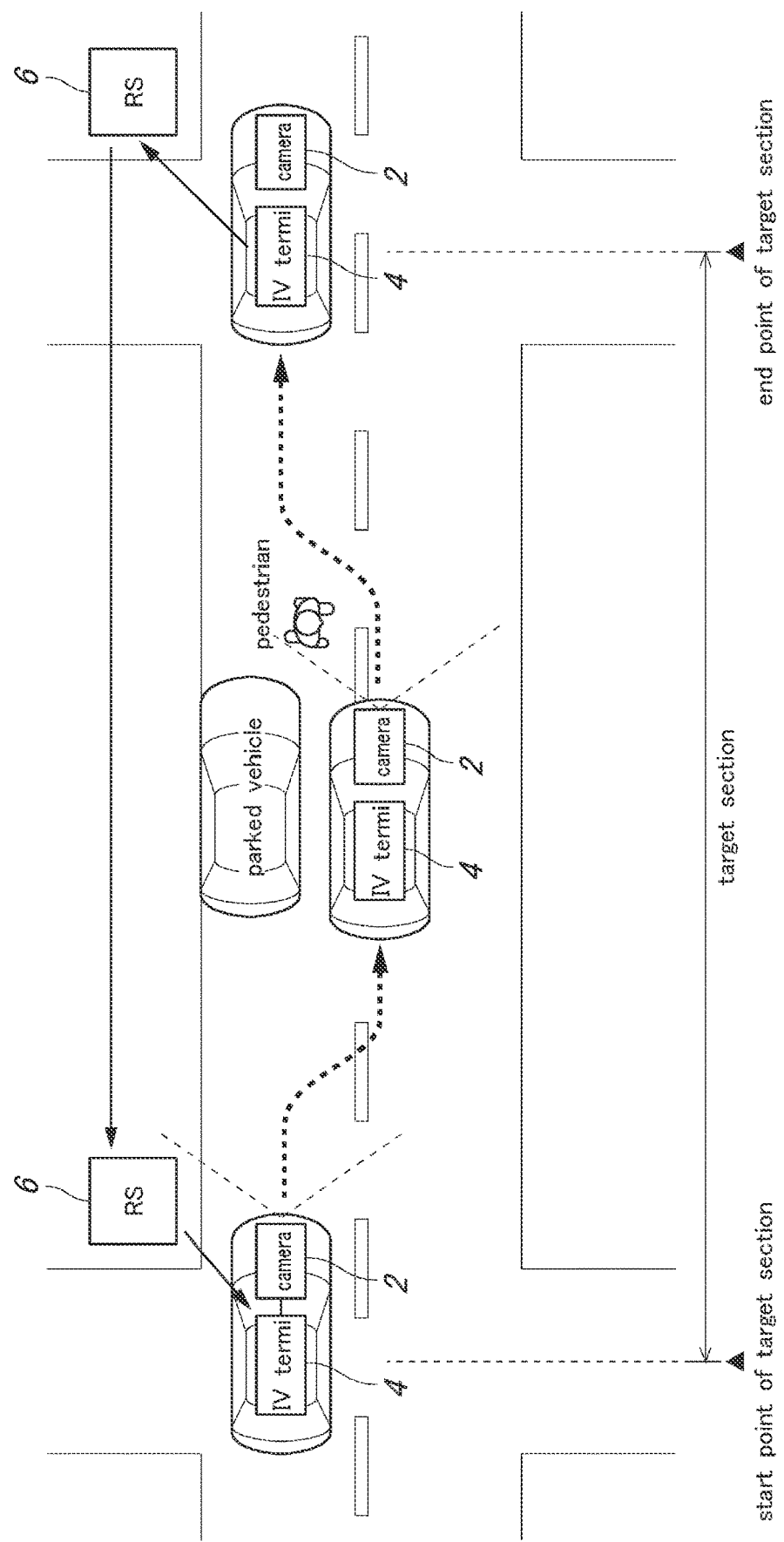
FIG. 12 is an explanatory diagram showing an outline of a travel assistance system according to a third embodiment of the present disclosure.
Figure 13A:
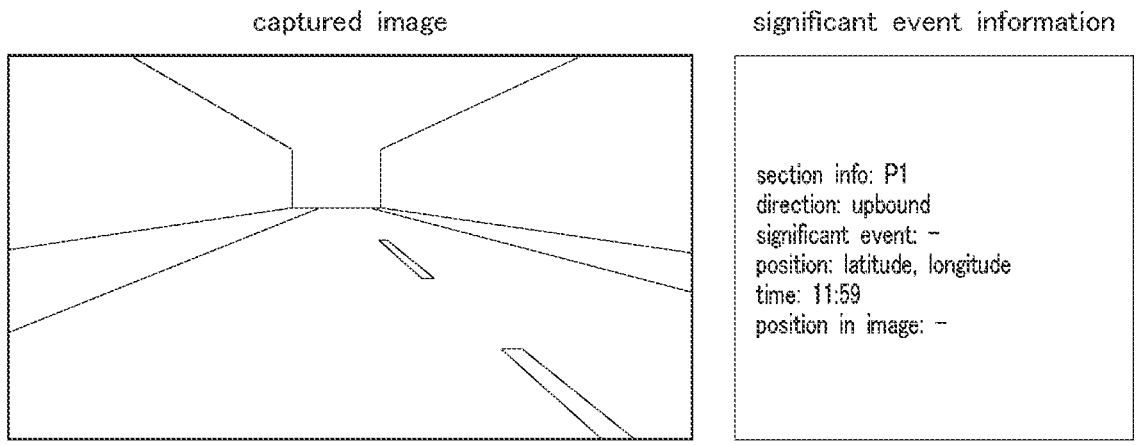
FIGS. 13A to 13C are explanatory diagrams showing images captured by a camera 2 and information on a significant event generated by an in-vehicle terminal 4 according to the third embodiment.
Figure 13B:
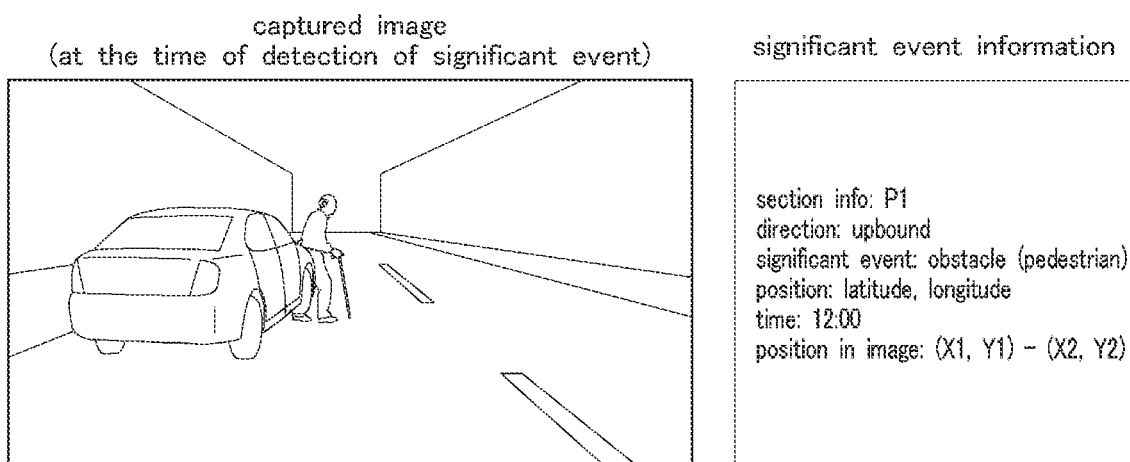
Figure 13C:
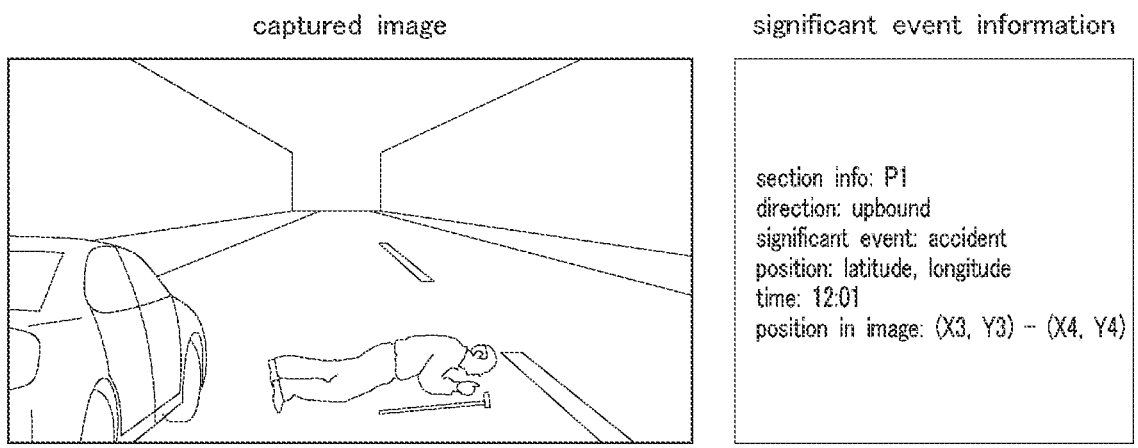

Next, a third embodiment of the present disclosure will be described. Except for what will be discussed here, the third embodiment is the same as the above-described embodiments. FIG. 12 is an explanatory diagram showing an outline of a travel assistance system according to the third embodiment of the present disclosure. FIGS. 13A to 13C are explanatory diagrams showing images captured by a camera 2 and information on a significant event generated by an in-vehicle terminal 4 according to the third embodiment.

As shown in FIG. 12, in a vehicle 1, a camera 2 captures images of a view looking frontward of the vehicle 1, and an in-vehicle terminal 4 detects a significant event occurring on the road ahead of the vehicle 1 and generates significant event information based on the images captured by the camera 2 (significant event detection operation). In the present embodiment, the in-vehicle terminal 4 detects that the vehicle 1 has an accident as a significant event. Or the in-vehicle terminal 4 detects that the vehicle 1 comes close to having an accident, for example coming close to colliding with a pedestrian running into the road, as a significant event.

FIGS. 13A to 13C show an example in which the vehicle 1 has a collision accident with a pedestrian running into the road as a significant event. At the time the image shown in FIG. 13A is captured, the captured image shows no obstacle on the road ahead of the vehicle 1. At the time the image shown in FIG. 13B is captured, the captured image shows that a pedestrian is running into the road. At the time the image shown in FIG. 13C is captured, the captured image shows that the vehicle 1 has collided with the pedestrian and the pedestrian has fallen on the road ahead of the vehicle 1. In this case, the images shown in FIGS. 13B and 13C are uploaded onto an end point roadside apparatus 6 as the captured image at the time of detection of the significant event.

As shown in FIG. 12, the end point roadside apparatus 6 transmits the captured image at the time of detection of the significant event and the significant event information received from the in-vehicle terminal 4 to a start point roadside apparatus 6 located at the start point of the target section.

Then, the start point roadside apparatus 6 stores the captured image at the time of detection of the significant event and the significant event information received from the end point roadside apparatus 6, in its memory. Then, the start point roadside apparatus 6 transmits the captured image at the time of detection of the significant event and the significant event information to the in-vehicle terminal 4 of a vehicle 1 which is entering the target section.

The vehicle 1, which has entered and is traveling in the target section, the in-vehicle terminal 4 instructs a danger avoidance operation (such as deceleration or detour) based on the captured image at the time of detection of the significant event and the significant event information received from the start point roadside apparatus 6, and in response to an instruction from the in-vehicle terminal 4 for the danger avoidance operation, the autonomous driving ECU 5 performs travel control.

In the present embodiment, the captured image at the time of detection of the significant event (at the time of the accident) is provided to vehicles passing through the target section afterward, which provides assistance for travel control of those vehicles. In other embodiments, a captured image at the time of detection of a significant event may be uploaded from a roadside apparatus 6 to a server and used as data for reinforcement learning to train an AI (artificial intelligence) model used for travel control of autonomous driving vehicles. In some cases, the captured image at the time of detection of the significant event stored in the server may be delivered to user terminals.

Figure 14:
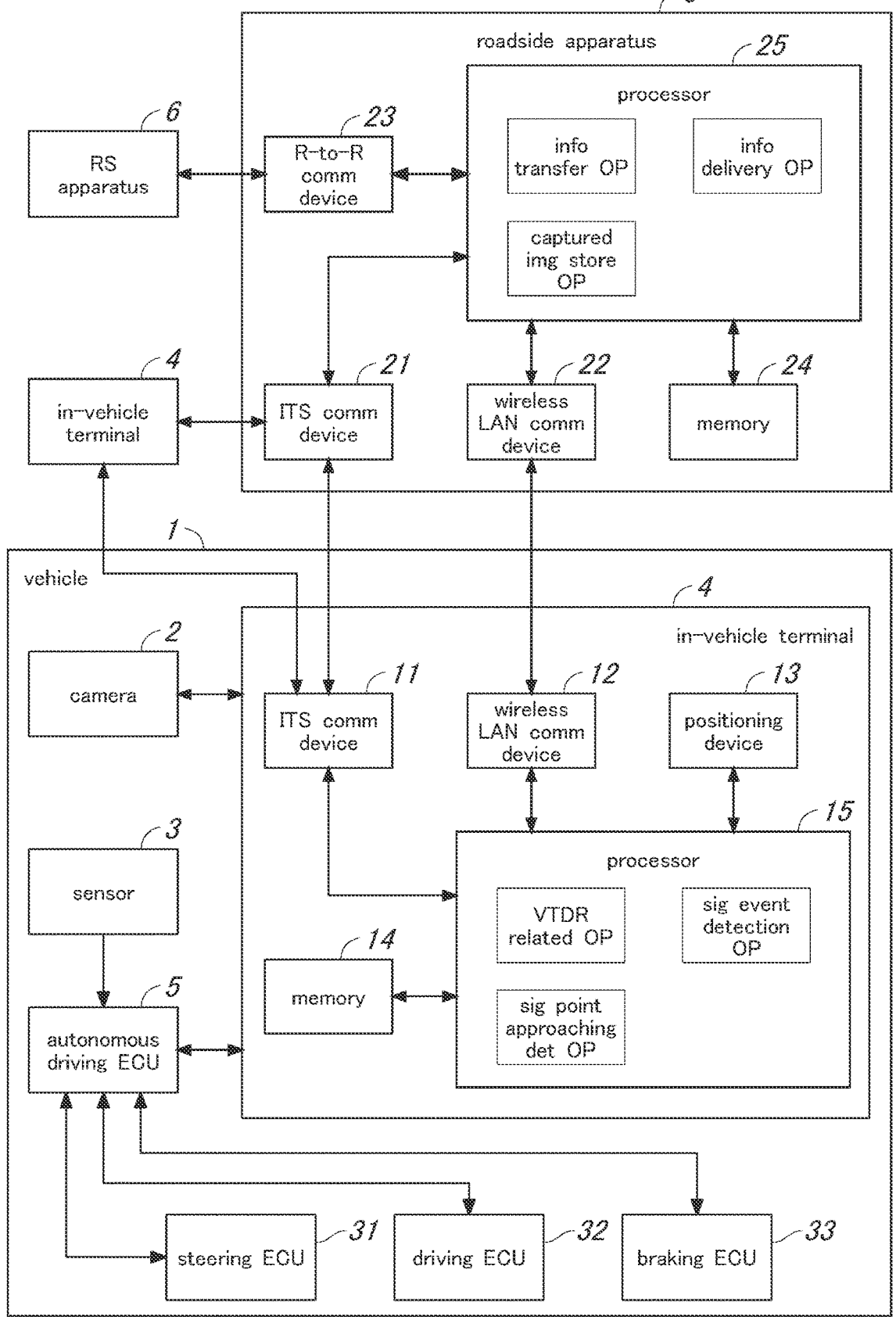
FIG. 14 is a block diagram showing schematic configurations of a vehicle 1 and a roadside apparatus 6 according to the third embodiment.

Next, schematic configurations of a vehicle 1 and a roadside apparatus 6 according to the third embodiment will be described. FIG. 14 is a block diagram showing schematic configurations of a vehicle 1 and a roadside apparatus 6.

The vehicle 1 is substantially the same as that of the first embodiment (FIG. 5) except that the processor 15 of the in-vehicle terminal 4 detects that the vehicle 1 has caused an accident based on outputs of the sensor 3 (such as acceleration sensor) as a significant event detection operation. The processor 15 also detects that the vehicle 1 comes close to having an accident. The captured image at the time of detection of the significant event is stored in the memory 14.

The roadside apparatus 6 is substantially the same as that of the first embodiment (FIG. 5) except that the roadside apparatus 6 is used as an start point roadside apparatus 6 located at the start point of a target section, and that the processor 25 therein acquires the captured image at the time of detection of the significant event and the significant event information from an end point roadside apparatus 6 located at the end point of the target section, and stores them in the memory 24 (captured image storing operation). The roadside apparatus 6 may be provided with a large-capacity storage device for storing a large amount of captured images.

Figure 15:
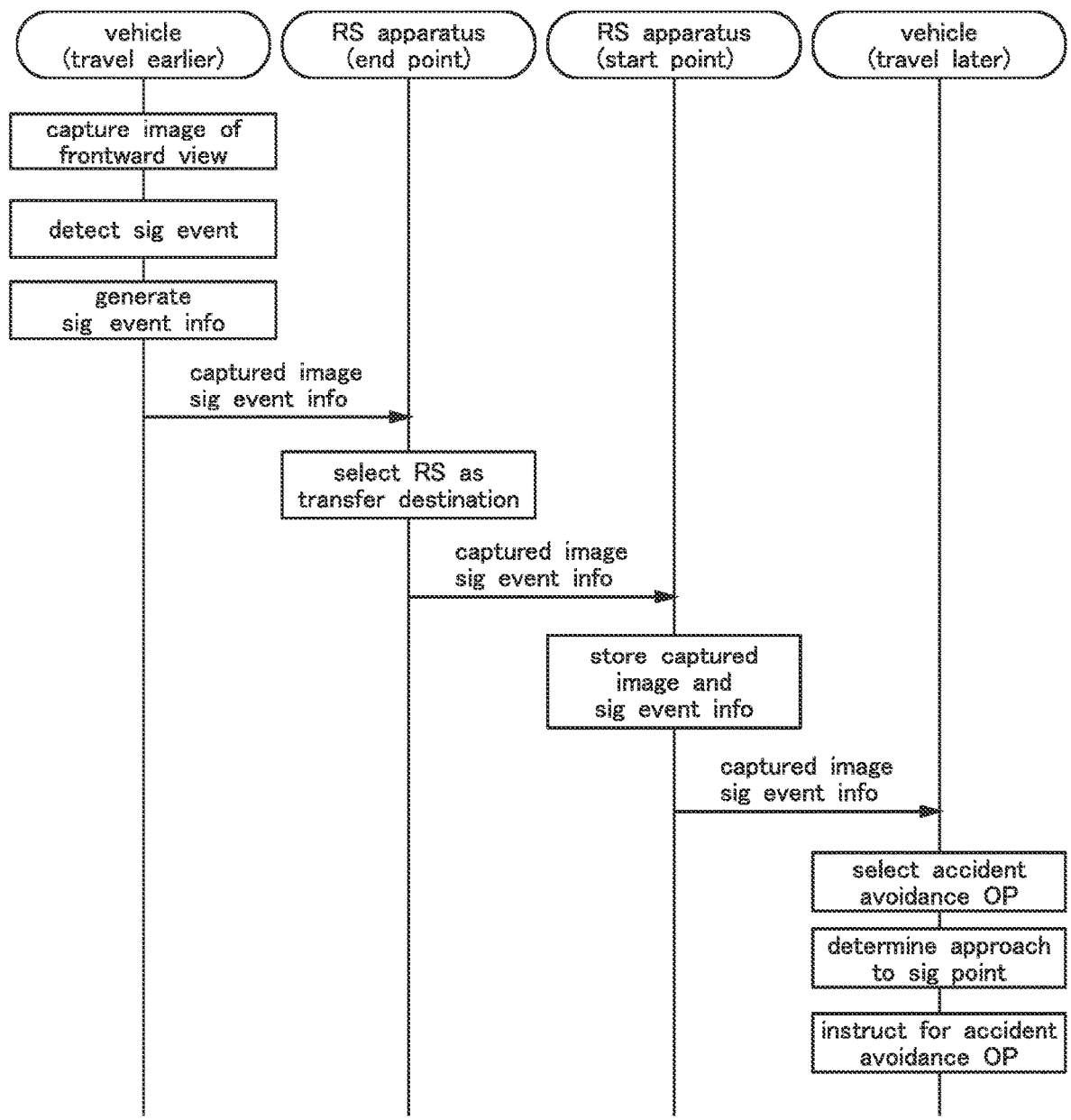
FIG. 15 is a sequence diagram showing procedures of operations performed by the vehicle and the roadside apparatus 6 according to the third embodiment.

Next, procedures of operations performed by the vehicle and the roadside apparatus 6 according to the third embodiment will be described. FIG. 15 is a sequence diagram showing procedures of operations performed by the vehicle and the roadside apparatus 6.

In the vehicle 1 that has passed through the target section first, the camera 2 captures images of a view looking frontward of the vehicle 1. Then, when the processor 15 of the in-vehicle terminal 4 detects that a significant event related to the vehicle 1 occurs (the vehicle 1 has had an accident or has come close to an accident), the processor generates significant event information, and stored the generated significant event information in the memory 14 (part of the VTDR), as additional information related to the captured image.

Next, when detecting that the vehicle 1 has reached a nearby area of the end point of the target section based on a positioning operation result from the positioning device 13, the processor 15 of the in-vehicle terminal 4 acquires the captured image at the time of occurrence of the significant event and the significant event information from the memory 14. Then, the wireless LAN communication device 12 of the in-vehicle terminal 4 transmits a message including the captured image at the time of occurrence of the significant event and the significant event information to an end point roadside apparatus 6 located at the end point of the target section.

In the end point roadside apparatus 6, when the wireless LAN communication device 22 receives the message transmitted from the in-vehicle terminal 4, the processor 25 selects a start point roadside apparatus 6 located at the start point of the target section as a transfer destination based on the significant event information included in the message, particularly on the section information. Then, the roadside-to-roadside communication device 23 transmits a message including the captured image at the time of detection of the significant event and the significant event information, to the start point roadside apparatus 6.

In the start point roadside apparatus 6, when the roadside-to-roadside communication device 23 receives the message transmitted from the end point roadside apparatus 6, the processor 25 acquires the captured image at the time of detection of the significant event and the significant event information included in the message and stores them in the memory 24. Then, the wireless LAN communication device 22 transmits a message including the captured image at the time of detection of the significant event and the significant event information, to in-vehicle terminals 4 that pass by the start point roadside apparatus 6. As the memory 24 also stores images captured during a predetermined period of time in the past and related significant event information, the wireless LAN communication device 22 transmits, in addition to the latest captured image at the time of detection of the significant event and the significant event information, images captured before capturing the latest image and related significant event information, to the in-vehicle terminals 4.

In the vehicle 1 that travels through the target section afterward, when the wireless LAN communication device 12 of the in-vehicle terminal 4 receives the message transmitted from the start point roadside apparatus 6, the processor 15 of the in-vehicle terminal 4 acquires the captured image at the time of occurrence of the accident and the significant event information included in the message, and stores them in the memory 14. Then, the processor 15 of the in-vehicle terminal 4 selects a danger avoidance operation (such as deceleration or detour) for avoiding an accident based on the captured image at the time of occurrence of the accident.

Next, the processor 15 of the in-vehicle terminal 4 performs the significant point approaching determination operation based on (i) a current captured image, which is output from the camera 2 and stored in the memory 14 (part of the VTDR), and (ii) the captured image at the time of occurrence of the accident at the significant point. This operation involves extracting a background image from the current captured image (background image extraction operation). Then, the in-vehicle terminal 4 compares the current background image extracted from the current captured image with the stored background image extracted from the captured image at the time of detection of the significant event, and determines whether or not the current background image matches the stored background image; that is, determines whether or not the degree of similarity between the two background images is greater than a predetermined value, to thereby determine whether or not the vehicle 1 has reached a nearby area of the significant point.

Then, when the vehicle 1 reaches the nearby area of the significant point, the processor 15 provides an instruction for the danger avoidance operation to the autonomous driving ECU 5. The autonomous driving ECU 5 performs travel control based on the instruction from the in-vehicle terminal 4.

Fourth Embodiment

Figure 16:
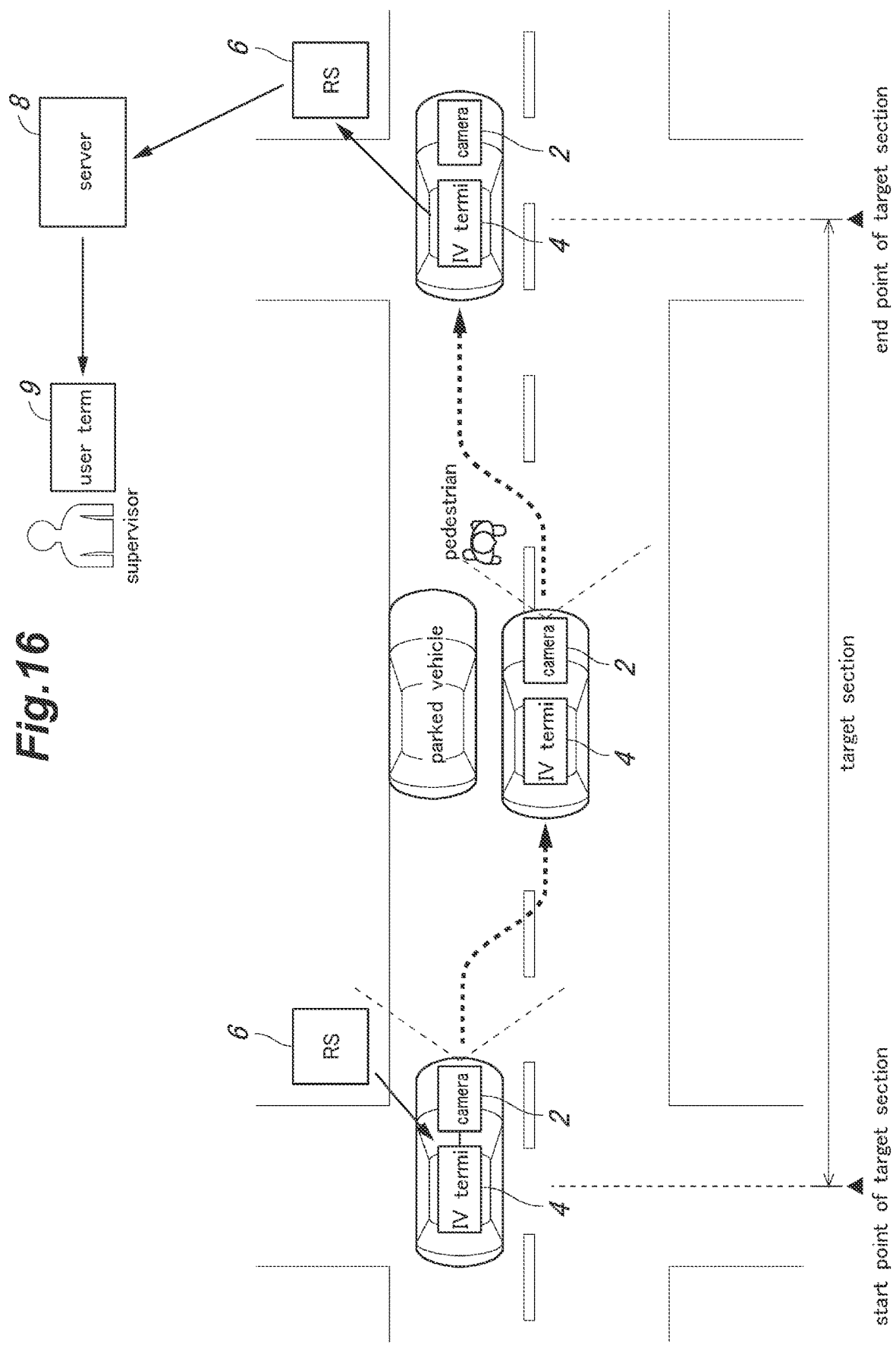
FIG. 16 is an explanatory diagram showing an outline of a travel assistance system according to a fourth embodiment of the present disclosure.

Next, a fourth embodiment of the present disclosure will be described. Except for will be discussed here, the fourth embodiment is the same as the above-described embodiments. FIG. 16 is an explanatory diagram showing an outline of a travel assistance system according to the fourth embodiment of the present disclosure.

In the present embodiment, in a vehicle traveling in a target section of a road, the camera 2 captures images of a view looking frontward of the vehicle, and the in-vehicle terminal 4 detects a significant event occurring on the road ahead of the vehicle 1 as in the previous embodiments. For example, the in-vehicle terminal 4 detects that the vehicle 1 has caused an accident in which the vehicle 1 has collided with a pedestrian running into the road from behind a parked vehicle. Then, the in-vehicle terminal 4 transmits the captured image at the time of detection of the significant event and the significant event information to an end point roadside apparatus 6 located at the end point of the target section.

In the present embodiment, the end point roadside apparatus 6 transmits the captured image at the time of detection of the significant event and the significant event information received from the in-vehicle terminal 4 to a start point roadside apparatus 6 located at the start point of the target section as in the previous embodiments. Then, the start point roadside apparatus 6 transmits the captured image at the time of detection of the significant event and the significant event information received from the end point roadside apparatus 6, to an in-vehicle terminal 4 of a vehicle 1 which is entering the target section. In the vehicle 1, when determining that the vehicle 1 has reached a nearby area of the significant point based on the captured image at the time of detection of the significant event, the in-vehicle terminal 4 causes an autonomous driving ECU 5 to start a danger avoidance operation at an earlier timing.

The present embodiment is different from the previous embodiments in that the end point roadside apparatus 6 located at the end point of the target section first acquires the captured image at the time of detection of the significant event and the significant event information from the vehicle that has detected the significant event, and then every time another vehicle passes through the target section, the end point roadside apparatus 6 acquires from each vehicle a captured image of the significant point where the significant event has occurred.

The server 8 (server device) first acquires the captured image at the time of detection of a significant event and the significant event state information from the end point roadside apparatus 6 located at the end point of the target section. Then, the server 8 acquires captured images of the significant point. As a result, the server 8 can collect, in addition to the captured image at the time of occurrence of the significant event, captured images of the significant point at subsequent different times. This enables a supervisor (or administrator) to confirm a situation at the site where the significant event (such as an accident) has occurred even when there is no stationary camera (fixed camera) that can view the site.

In response to an access (viewing request) from a user terminal 9 (user device) which a supervisor or an administrator operates, the server 8 delivers a captured image of a point designated by the supervisor to the user terminal 9 In this operation, the user terminal 9 displays an icon on the map indicating a point where an accident has occurred in the past. When the supervisor operates the icon to designate a point, the user terminal 9 displays a captured image of the designated point.

In the present embodiment, the in-vehicle terminal 4 determines whether or not the vehicle has reached a nearby area of the significant point, and uploads onto the roadside apparatus 6 an image captured at the time when the vehicle reaches the area of the significant point; that is, a current captured image of the significant point. However, in other embodiments, the in-vehicle terminal 4 may upload not only a captured image of the significant point, but all the captured images in the target section onto the roadside apparatus 6, and the roadside apparatus 6 may extract the captured image of the significant point in the target section by using position information or image matching.

In other cases, the server may be configured to collect not only a captured image of the significant point but also all the captured images in the target section. As a result, the supervisor can confirm a recent state of any point on the road by designating the point in the map to cause the user terminal to display the latest captured image of the designated point. For example, this configuration can be used to search for persons, such as the elderly with dementia and lost children. Furthermore, this configuration can also be used for crime prevention and disaster prevention, for example. In another embodiment, the server may be configured to collect all captured images in the target section only in a specific time zone. For example, the system may be configured to collect all captured images in the target section only during the time zones when children travel to and from school, so that the system can be used for watching over the children on their way to or back from school.

Moreover, when being configured to collect all captured images in the target section, the system can acquire captured images of a significant point at times before the time of occurrence of a significant event (accident). This configuration allows a supervisor to confirm the situation at the site at times around the time of occurrence of the significant event.

Figure 17:
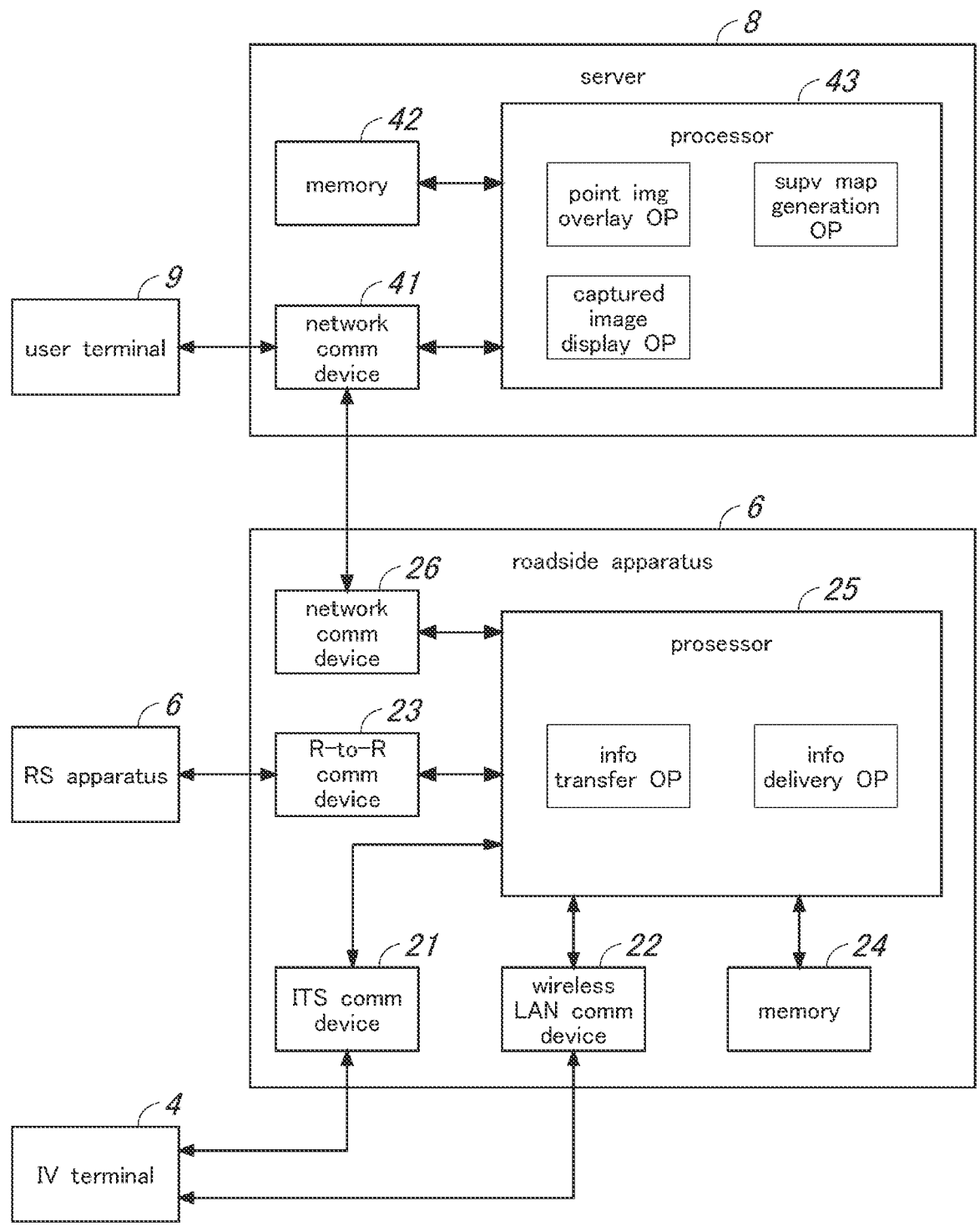
FIG. 17 is a block diagram showing schematic configurations of a vehicle 1, a roadside apparatus 6, and a server 8 according to the fourth embodiment.

Next, schematic configurations of a vehicle 1, a roadside apparatus 6, and a server 8 according to the fourth embodiment will be described. FIG. 17 is a block diagram showing schematic configurations of a vehicle 1, a roadside apparatus 6, and a server 8 according to the fourth embodiment.

The configuration of the vehicle 1 is the same as that of the first embodiment (FIG. 5).

The roadside apparatus 6 is substantially the same as that of the first embodiment except that the roadside apparatus 6 includes a network communication device 26 in addition to the ITS communication device 21, the wireless LAN communication device 22, and the roadside-to-roadside communication device 23. The network communication device 26 communicates with the server 8 via a network.

The server 8 includes a network communication device 41, a memory 42, and a processor 43.

The network communication device 41 communicates with a roadside apparatus 6 via a network. The network communication device 41 communicates with a user terminal 9, which a supervisor can operate, via the network.

The memory 42 stores captured images of each point collected from the roadside apparatus 6. The memory 42 also stores programs executable by the processor 43. The server 8 may be provided with a large-capacity storage device for storing a large amount of captured images.

The processor 43 performs various processing operations by executing the programs stored in the memory 42. In the present embodiment, the processor 43 performs a point image overlay operation, a supervising map generation operation, and a captured image display operation.

In the point image overlay operation, the processor 43 collects the captured images of different points from the roadside apparatus 6, arranges the images in order of the respective shooting times, and combines them into one image.

In the supervising map generation operation, the processor 43 generates screen information in which an icon representing the significant point is overlaid on the map based on the position information on the position of the significant point. Then, the network communication device transmits the generated screen information to the user terminal 9, which in turn displays a screen including icons representing the respective points overlaid on the map. A supervisor can operate each icon to designate a corresponding point.

In the captured image display operation, the processor 43 acquires the captured image of the point designated by the supervisor, from the memory 42, and generates screen information for displaying (reproducing) a current captured image of the designated point. The network communication device 41 transmits the generated screen information to the user terminal 9, which in turn displays a screen for displaying the captured image.

In the present embodiment, the captured images of the respective points are combined. In other embodiments, images of the point designated by the supervisor captured at different times may be sequentially reproduced in order of the respective shooting times.

In the present embodiment, a captured image of the point designated by a supervisor is reproduced. In other embodiments, when multiple significant events (accidents or states in which an accident comes close to occurring) of different types (such as pedestrian accidents and bicycle accidents) occur at the same point, the captured images may be classified according to the type the accident so that the system can reproduce captured images of a significant event of the type designated by the supervisor.

Figure 18:
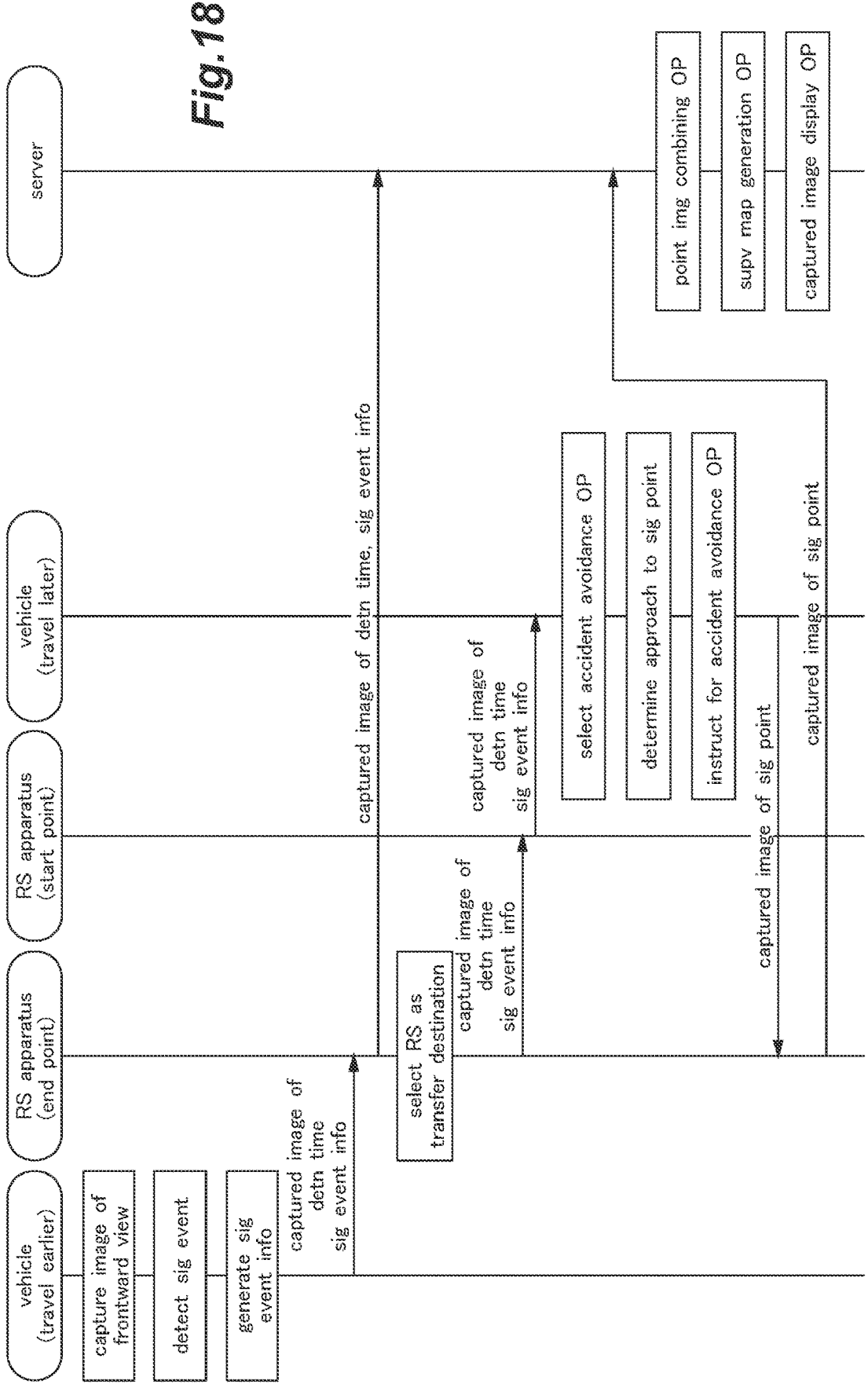
FIG. 18 is a sequence diagram showing procedures of operations performed by the vehicle 1, the roadside apparatus 6, and the server 8 according to the fourth embodiment.

Next, procedures of operations performed by the vehicle 1, the roadside apparatus 6, and the server 8 according to the fourth embodiment will be described. FIG. 18 is a sequence diagram showing procedures of operations performed by the vehicle 1, the roadside apparatus 6, and the server 8.

In the vehicle 1 that has passed through the target section first, when the processor 15 of the in-vehicle terminal 4 detects that a significant event related to the vehicle 1 occurs (the vehicle 1 has had an accident or has come close to an accident), the processor generates significant event information, and stores the generated significant event information in the memory 14 (part of the VTDR), as additional information related to the captured image.

Next, when detecting that the vehicle 1 has reached a nearby area of the end point of the target section based on a positioning operation result from the positioning device 13, the processor 15 of the in-vehicle terminal 4 acquires the captured image at the time of occurrence of the significant event and the significant event information from the memory 14 (part of the VTDR). Then, the wireless LAN communication device 12 of the in-vehicle terminal 4 transmits a message including the captured image at the time of occurrence of the significant event and the significant event information to an end point roadside apparatus 6 located at the end point of the target section.

In the end point roadside apparatus 6, when the wireless LAN communication device 22 receives the message transmitted from the in-vehicle terminal 4, the processor 25 selects a start point roadside apparatus 6 located at the start point of the target section as a transfer destination based on the significant event information included in the message, particularly on the section information. Then, the roadside-to-roadside communication device 23 transmits a message including the captured image at the time of detection of the significant event and the significant event information, to the start point roadside apparatus 6. In addition, the network communication device 26 transmits a significant point report including the captured image at the time of detection of the significant event and the significant event information to the server 8.

In the start point roadside apparatus 6, when the roadside-to-roadside communication device 23 receives the message transmitted from the end point roadside apparatus 6, the processor 25 acquires the captured image at the time of detection of the significant event and the significant event information included in the message. Then, the wireless LAN communication device 22 transmits a message including the captured image at the time of detection of the significant event and the significant event information, to in-vehicle terminals 4 of vehicles that pass by the start point roadside apparatus 6.

In the vehicle 1 that travels through the target section afterward, when the wireless LAN communication device 12 of the in-vehicle terminal 4 receives the message transmitted from the start point roadside apparatus 6, the processor 15 of the in-vehicle terminal 4 extracts a background image from the captured image at the time of detection of the significant event (background image extraction operation). The processor 15 also extracts a background image from a current captured image, which is output from the camera 2, and stores it in the memory 14 (part of the VTDR) (background image extraction operation).

Next, the processor 15 of the in-vehicle terminal 4 starts a significant point approaching determination operation. In this operation, the processor 15 compares the current background image extracted from the current captured image with the stored background image extracted from the captured image at the time of detection of the significant event, and determines whether or not the current background image matches the stored background image; that is, determines whether or not the degree of similarity between the two background images is greater than a predetermined value. When finding a relevant image (i.e., the captured image of the significant point) out of the current captured images, the processor 15 stores significant event information as additional information related to the captured image, in the memory 14 (part of the VTDR).

Next, when detecting that the vehicle 1 has reached the end point of the target section based on a positioning operation result from the positioning device 13, the processor 15 of the in-vehicle terminal 4 acquires the captured image at the time of detection of the significant event. Then, the wireless LAN communication device 12 of the in-vehicle terminal 4 transmits a message including the captured image of the significant point, to an end point roadside apparatus 6 located at the end point of the target section.

In the present embodiment, the in-vehicle terminal 4 performs a significant point image search operation. However, the in-vehicle terminal 4 may provide all captured images acquired in the target section to a roadside apparatus 6, and the roadside apparatus 6 may perform the significant point image search operation.

In the end point roadside apparatus 6, when the wireless LAN communication device 22 receives the message transmitted from the in-vehicle terminal 4, the processor 25 acquires the captured image at the time of detection of the significant event and the significant event information included in the message. Then the network communication device 26 transmits a message including the captured image at the time of detection of the significant event and the significant event information to the server 8.

In the server 8, when the network communication device 41 receives a significant point traveling report message transmitted from the roadside apparatus 6, the processor 43 stores the captured image of the significant point and the significant event information included in the significant point traveling report message in the memory 42. In this operation, the processor 43 arranges the captured images of different points from the roadside apparatus 6 in order of the respective shooting times, combines them into one image, and stores it in the memory 42 (image combining operation). Next, the processor 43 overlays an icon representing the significant point on the map based on the position information on the position of the significant point (supervising map generation operation). The user terminal 9, which is connected to the server 8, displays the icon on the map. When a supervisor operates the icon displayed on the user terminal 9 to designate the significant point, the processor 43 acquires the captured image of the designated significant point from the memory 42, generates a screen for reproducing a current captured image at the significant point, and displays it on the user terminal 9 (captured image display operation).

In the above-described embodiments, when information is provided from one vehicle to another, the information is transmitted between the vehicles via the roadside apparatus 6 through indirect roadside-to-vehicle communications. However, direct vehicle-to-vehicle communications (ITS communications) and indirect roadside-to-vehicle communications (wireless LAN communication) may be switched depending on the situation. The system may be configured such that either direct communications or indirect communication is selected depending on the situation. For example, since pedestrian information about a dangerous person; that is, a person who has taken a dangerous action (such as running into the road) in the past, is considered as highly urgent information, such pedestrian information may be transmitted to the surrounding in-vehicle terminals 4 through direct vehicle-to-vehicle communications, and since road information related to construction work and traffic jams is considered as less urgent information, such road information may be transmitted to the in-vehicle terminals 4 located nearby via the roadside apparatus 6 through indirect roadside-to-vehicle communications.

Direct vehicle-to-vehicle communications (ITS communications) and indirect roadside-to-vehicle communications (wireless LAN communication) may be used simultaneously. This configuration can enhance the stability of communications, in particular in the case of high urgency, e.g., communications for an emergency vehicle (such as an ambulance).

In the above-described embodiments, a captured image and significant event information acquired by a vehicle passing through a target section are provided to vehicles which subsequently pass through the target section. In other embodiments, a roadside apparatus 6 shoots the surroundings of the roadside apparatus 6 (such as an intersection) with its camera 2 to acquire a captured image and significant event information, and transmits them to vehicles. In this case, significant event information collected by a first roadside apparatus 6 ahead of a vehicle in the traveling direction may be provided to the vehicle via a second roadside apparatus 6 located frontward of and closer to the vehicle than the first roadside apparatus 6. This configuration allows the vehicle to recognize in advance a situation of a certain point of the road (such as an intersection) ahead of the vehicle.

There are cases where any vehicle equipped with a VTDR and a device for delivering images does not pass a target section for a long time. In such cases, the system cannot collect information on road conditions for a long time. Thus, the system may be configured such that, when any vehicle equipped with a VTDR does not pass for a predetermined time, a roadside apparatus 6 starts information processing operations. In this case, the system is preferably configured such that a roadside apparatus 6 receives information indicating that a vehicle is equipped with a VTDR and a device for delivering images. This configuration enables the roadside apparatus 6 to detect a vehicle is equipped with a VTDR and a device for delivering images. Upon receiving such information, the roadside apparatus 6 may stop performing operations for detecting a significant event and transmitting significant event information (including captured images).

Alternatively, the system may be configured such that a flying robot (such as a drone) or a walking robot which is equipped with a VTDR and a device for delivering images, is placed around a roadside apparatus 6, and such a flying robot or walking robot collects and delivers the above-described information. Furthermore, when it is difficult for a VTDR mounted in a vehicle to capture images (e.g., when a bicycle or motorcycle is running close to and on the left back side of the vehicle and there is no vehicle equipped with a VTDR and a device for delivering images and traveling behind the vehicle), a roadside apparatus 6, a flying robot, a walking robot, or any other device may collect and deliver the above-described information.

In some cases, collected significant event information can be consolidated to a single location such as a server, which performs analysis on the collected information, thereby notifying a vehicle located near a significant location of relevant information in advance. In this configuration, when there is a place where accidents are likely to occur, the system can notify vehicles in advance not only the location of a common site of accidents, but also the types or causes of accidents at the site.

The system may be configured such that, when detecting significant event information that can lead to a possibly dangerous action taken by a person (for example, when detecting a vehicle traveling at a speed of a predetermined level or more, or an inter-vehicular distance that is below a predetermined level), the system immediately notifies the police or any other authority of the information. This configuration can lead to suppression of dangerous actions such as drunk driving and road rage.

Specific embodiments of the present disclosure are described herein for illustrative purposes. However, the present disclosure is not limited to those specific embodiments, and various changes, substitutions, additions, and omissions may be made for features of the embodiments without departing from the scope of the invention. In addition, elements and features of the different embodiments may be combined with each other to yield an embodiment which is within the scope of the present disclosure.

INDUSTRIAL APPLICABILITY

A travel assistance method, a road captured image collection method, and a roadside device according to the present disclosure can detect a dangerous event to thereby reduce load on a travel controller that performs a danger avoidance operation, as well as providing suitable assistance for safe travel control of autonomous vehicles, and are useful as a travel assistance method for assisting travel control of a vehicle, a road captured image collection method for collecting images of a road, and a roadside device for assisting travel control of a vehicle and collecting images of a road.

GLOSSARY 1 vehicle
2 camera
3 sensor
4 in-vehicle terminal (in-vehicle device)
5 autonomous driving ECU (travel control device)
6 roadside apparatus (roadside device)
8 server (server device)
9 user terminal (user device)
11 ITS communication device
12 wireless LAN communication device
13 positioning device
14 memory
15 processor
21 ITS communication device
22 wireless LAN communication device
23 roadside-to-roadside communication device
24 memory
25 processor
26 network communication device
31 steering ECU
32 driving ECU
33 braking ECU
41 network communication device
42 memory
43 processor

The invention claimed is:

1. A travel assistance method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device,
   wherein when the roadside device does not receive, for a defined period of time, vehicle-traveling-data-recorder (VTDR) information indicating presence of a vehicle equipped with a VTDR and a device for delivering images, the roadside device starts detecting a significant event, and captures an image and additional information related to the significant event detected by the roadside device,
   wherein when the roadside device receives the VTDR information, the roadside device stops detecting a significant event, and receives the captured image and additional information related to the significant event detected by the information source in-vehicle device,
   wherein the roadside device transmits the captured image and additional information related to the significant event acquired from the roadside device or the information source in-vehicle device, directly or through a different roadside device to an information destination in-vehicle device mounted in a receiver vehicle which starts to travel in the target section, and
   wherein the information destination in-vehicle device performs operations related to travel control based on the captured image and additional information related to the significant event.

2. The travel assistance method according to claim 1, wherein the additional information includes:
   section information on the section through which the vehicle has been traveling;
   direction information on the direction of travel of the vehicle;
   event information on the significant event;
   vehicle position information on the position of the vehicle in a map at the time of detection of the significant event;
   event location information on the location in the captured image at which the significant event has occurred; and
   time information on the time of detection of the significant event.

3. The travel assistance method according to claim 1, wherein the information destination in-vehicle device determines that the receiver vehicle is approaching the location of the occurrence of the significant event, based on a similarity between the captured image related to the significant event and a current captured image.

4. The travel assistance method according to claim 3, wherein, when determining that the receiver vehicle is approaching the location of the occurrence of the significant event, the information destination in-vehicle device outputs a danger avoidance operation instruction to a cruise controller.

5. The travel assistance method according to claim 1, wherein the information source in-vehicle device transmits the captured image and additional information related to the significant event to an end point roadside device located at an end point of the target section,
   wherein the end point roadside device transmits the captured image and additional information related to the significant event to a start point roadside device located at a start point of the target section, and wherein the start point roadside device transmits the captured image and additional information related to the significant event to the information destination in-vehicle device.

6. The travel assistance method according to claim 1, wherein the information source in-vehicle device is mounted in the vehicle which travels in the target section in a first direction,
wherein the information destination in-vehicle device is mounted in the receiver vehicle which travels in the target section in a second direction opposite to the first direction, and
wherein the roadside device is configured to:
extract an image of a moving object that appears in front of a view blocking object from the captured image acquired from the information source in-vehicle device in the vehicle traveling in the first direction;
calculate the position of the moving object in a second captured image which was acquired in the past from the information source in-vehicle device mounted in a vehicle which traveled in the second direction;
generate a composite image in which the image of the moving object is overlaid on the second captured image based on the calculated position of the moving object; and
transmit the composite image as the captured image of the significant event to the information destination in-vehicle device.

7. The travel assistance method according to claim 1, wherein the significant event is a traffic accident,
wherein the roadside device is configured to:
store and maintain therein a captured image and additional information related to the significant event acquired from the information source in-vehicle device or the roadside device; and
transmit, in addition to the latest captured image and additional information related to the significant event, a captured image and additional information which have been maintained before capturing the latest captured image and additional information in the roadside device to the information destination in-vehicle device.

8. A road captured image collection method, wherein, when a vehicle passes through a target section of a road after an information source in-vehicle device mounted in the vehicle has detected a significant event while the vehicle is traveling in the target section, the information source in-vehicle device transmits a captured image and additional information related to the significant event to a roadside device,
wherein when the roadside device receives the captured image and additional information related to the significant event detected by the information source in-vehicle device, the roadside device transmits the captured image and additional information related to the significant event detected by the information source in-vehicle device to a server device,
wherein when the roadside device does not receive, for a defined period of time, vehicle-traveling-data-recorder (VTDR) information indicating presence of a vehicle equipped with a VTDR and a device for delivering images, the roadside device starts detecting a significant event, captures an image and additional information related to the significant event detected by the roadside device, and transmits the captured image and additional information related to the significant event detected by the roadside device to the server device, wherein the server device stores and maintains the captured image and additional information related to the significant event, and
wherein, in response to a view request with specifying a location from a user, the server device presents the captured image and additional information related to the significant event at the specified location, to the user.

9. A roadside device comprising:
a roadside-to-vehicle communication device configured to communicates with an in- vehicle device;
a processor,
wherein the processor is configured such that,
under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device,
when the roadside-to-vehicle communication device receives the captured image and additional information related to the significant event transmitted from the information source in-vehicle device, the processor causes the roadside-to-vehicle communication device to transmit the captured image and additional information related to the significant event directly or through a different roadside device to an information destination in-vehicle device mounted in a receiver vehicle which starts to travel in the target section, and
when the roadside-to-vehicle communication device does not receive, for a defined period of time, vehicle-traveling-data-recorder (VTDR) information indicating presence of a vehicle equipped with a VTDR and a device for delivering images, the roadside device starts detecting a significant event, captures an image and additional information related to the significant event detected by the roadside device, and the processor causes the roadside-to-vehicle communication device to transmit the captured image and additional information related to the significant event detected by the roadside device directly or through a different roadside device to the information destination in-vehicle device mounted in the receiver vehicle which starts to travel in the target section.

10. The roadside device according to claim 9, wherein the roadside-to-vehicle communication device is configured such that,
when the roadside device is located at an end point of the target section, the roadside-to-vehicle communication device receives the captured image and additional information related to the significant event from the information source in-vehicle device, and
when the roadside device is located at a start point of the target section, the roadside-to-vehicle communication device transmits the captured image and additional information related to the significant event to the information destination in-vehicle device.

11. The roadside device according to claim 9, wherein the roadside-to-vehicle communication device is configured to:
receive the captured image and additional information related to the significant event from the information source in-vehicle device mounted in a vehicle which travels in the target section in a first direction; and
transmit the captured image and additional information related to the significant event to the information destination in-vehicle device mounted in the receiver vehicle which travels in the target section in a second direction opposite to the first direction, and wherein the processor is configured to:

extract an image of a moving object that appears in front of a view blocking object from the captured image acquired from the information source in-vehicle device in the vehicle traveling in the first direction;

calculate the position of the moving object in a second captured image which was acquired in the past from the information source in-vehicle device mounted in a vehicle which traveled in the second direction;

generate a composite image in which the image of the moving object is overlaid on the second captured image based on the calculated position of the moving object; and transmit the composite image as the captured image of the significant event to the information destination in-vehicle device.

12. The roadside device according to claim 9, wherein the significant event is a traffic accident, wherein the processor is configured to:

store and maintain in a storage a captured image and additional information related to the significant event acquired from the information source in-vehicle device or the roadside device; and transmit, in addition to the latest captured image and additional information related to the significant event, a captured image and additional information which have been maintained before capturing the latest captured image and additional information in the storage to the information destination in-vehicle device.

13. A roadside device comprising:

a roadside-to-vehicle communication device configured to communicates with an in- vehicle device;

a processor, wherein the processor is configured such that, under a situation where, when a vehicle passes through a target section of a road after an information source in-vehicle device mounted in the vehicle has detected a significant event while the vehicle is traveling in the target section, the information source in-vehicle device transmits a captured image and additional information related to the significant event to the roadside device, when the roadside-to-vehicle communication device receives the captured image and additional information related to the significant event transmitted from the information source in-vehicle device, the processor causes the roadside device to transmit the captured image and additional information related to the significant event to a server device, and when the roadside-to-vehicle communication device does not receive, for a defined period of time, vehicle-traveling-data-recorder (VTDR) information indicating presence of a vehicle equipped with a VTDR and a device for delivering images, the roadside device starts detecting a significant event, captures an image and additional information related to the significant event detected by the roadside device, and the processor causes the roadside device to transmit the captured image and additional information related to the significant event detected by the roadside device to the server device.

* * * * *